US012811696B2

(12) United States Patent
Mesharafa et al.

(10) Patent No.: US 12,811,696 B2
(45) Date of Patent: Nov. 24, 2026

(54) WIRELESS COMMUNICATION METHOD FOR AN UNDERWATER VEHICLE AND ASSOCIATED UNDERWATER SYSTEM

(71) Applicant: Heliopolis Holdings Limited, Northwood (GB)

(72) Inventors: Hussein Mesharafa, Giza (EG); Aya Hallouda, Giza (EG); Ibrahim Habib, Alexandria (EG)

(73) Assignee: HELIOPOLIS HOLDINGS LIMITED, Northwood (GB)

( * ) Notice: Subject to any disclaimer, the term of this patent is extended or adjusted under 35 U.S.C. 154(b) by 239 days.

(21) Appl. No.: 18/685,741

(22) PCT Filed: Aug. 26, 2022

(86) PCT No.: PCT/IB2022/020062
§ 371 (c)(1),
(2) Date: Feb. 22, 2024

(87) PCT Pub. No.: WO2023/026101
PCT Pub. Date: Mar. 2, 2023

(65) Prior Publication Data
US 2024/0356658 A1 Oct. 24, 2024

(30) Foreign Application Priority Data
Aug. 27, 2021 (IT) ........................ 102021000022481

(51) Int. Cl.
*H04B 10/80* (2013.01)
*G08C 23/02* (2006.01)

(52) U.S. Cl.
CPC ............. *H04B 10/80* (2013.01); *G08C 23/02* (2013.01)

(58) Field of Classification Search
CPC ................................ H04B 10/80; G08C 23/02
(Continued)

(56) References Cited

U.S. PATENT DOCUMENTS 4,310,904 A 1/1982 Ballard et al.
5,579,285 A 11/1996 Hubert
(Continued)

FOREIGN PATENT DOCUMENTS

CN 109319074 A 2/2019
CN 109515661 A 3/2019
(Continued)

OTHER PUBLICATIONS

International Search Report and Written Opinion issued in International Patent Application No. PCT/IB2022/020062, dated Nov. 18, 2022.
(Continued)

*Primary Examiner* — Dalzid E Singh
(74) *Attorney, Agent, or Firm* — Jones Burke, PLLC

(57) ABSTRACT

The present disclosure relates to a wireless communication method comprising providing a base station for an underwater vehicle with at least a first hydrophone and providing an underwater vehicle configured to be operatively coupled with the base station with at least a second hydrophone. The method also comprises adapting and/or configuring the first hydrophone and the second hydrophone to allow transmission and reception of ultrasonic and/or acoustic signals and providing the base station with at least a first optical communication device and the underwater vehicle with at least a second optical communication device. The first optical communication device and the second optical communication device comprise an optical transmitter and/or an optical receiver, such that a signal a signal is set up between the base station and the underwater vehicle. The method further includes transmission of at least one ultrasonic and/or acoustic signal and/or transmission of at least one optical signal.

16 Claims, 4 Drawing Sheets

(58) Field of Classification Search
USPC .......................................................... 398/104
See application file for complete search history.

(56) References Cited

U.S. PATENT DOCUMENTS

| | | | | |
|---|---|---|---|---|
| 6,808,021 | B2 | 10/2004 | Zimmerman et al. | |
| 8,145,369 | B1 | 3/2012 | Tureaud et al. | |
| 9,820,017 | B2 * | 11/2017 | Hunter | E21B 33/038 |
| 10,392,086 | B2 | 8/2019 | Trigui et al. | |
| 10,725,149 | B1 | 7/2020 | Premus et al. | |
| 10,737,749 | B2 | 8/2020 | Easterling | |
| 10,942,526 | B2 | 3/2021 | Beyerer et al. | |
| 2009/0264081 | A1 * | 10/2009 | Sato | H04B 11/00 455/68 |
| 2012/0289103 | A1 | 11/2012 | Hudson et al. | |
| 2015/0288459 | A1 | 10/2015 | Crowell | |
| 2016/0121009 | A1 * | 5/2016 | Farr | H04B 10/80 250/492.1 |
| 2016/0127042 | A1 | 5/2016 | Farr et al. | |
| 2018/0102854 | A1 | 4/2018 | Kimura et al. | |
| 2020/0042020 | A1 | 2/2020 | Zhang et al. | |
| 2020/0052800 | A1 | 2/2020 | Butka et al. | |
| 2021/0048544 | A1 | 2/2021 | Wolfel et al. | |

FOREIGN PATENT DOCUMENTS

| | | | | | |
|---|---|---|---|---|---|
| CN | 110677223 | A | | 1/2020 | |
| CN | 111572737 | A | | 8/2020 | |
| EP | 1846288 | B1 | | 1/2006 | |
| EP | 2412626 | A1 | | 2/2012 | |
| JP | 2017165333 | A | * | 9/2017 | B63C 11/00 |
| JP | 2023021835 | A | * | 2/2023 | G06T 7/00 |
| WO | 2016149199 | A1 | | 9/2016 | |
| WO | 2018215642 | A1 | | 11/2018 | |
| WO | 2020092903 | A1 | | 5/2020 | |

OTHER PUBLICATIONS

Search Report and Written Opinion issued in Italian Patent Application No. 102021000022481, dated May 10, 2022.

* cited by examiner

FIG.1
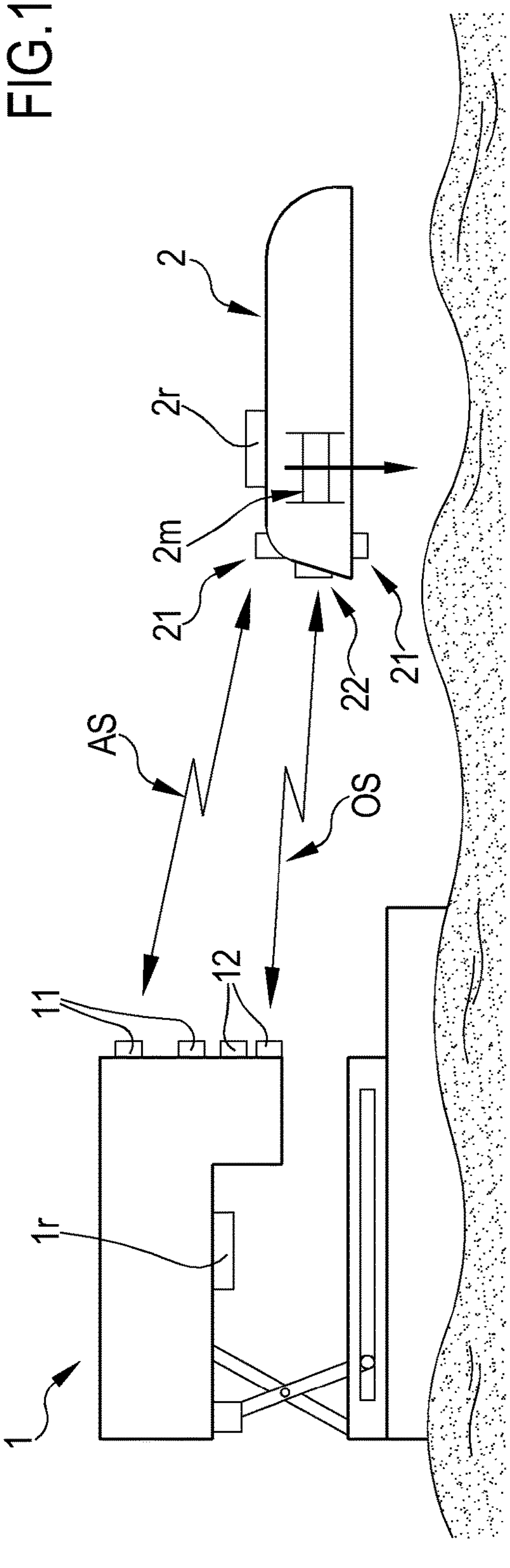
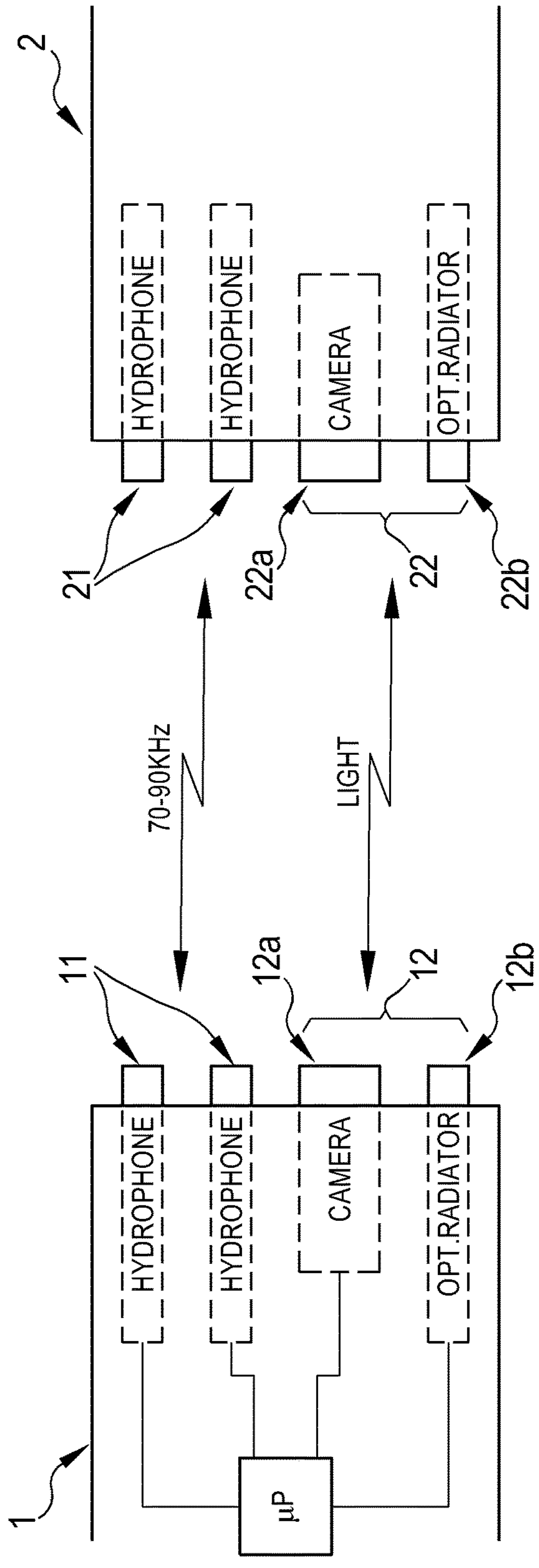
FIG.2

FIG.6
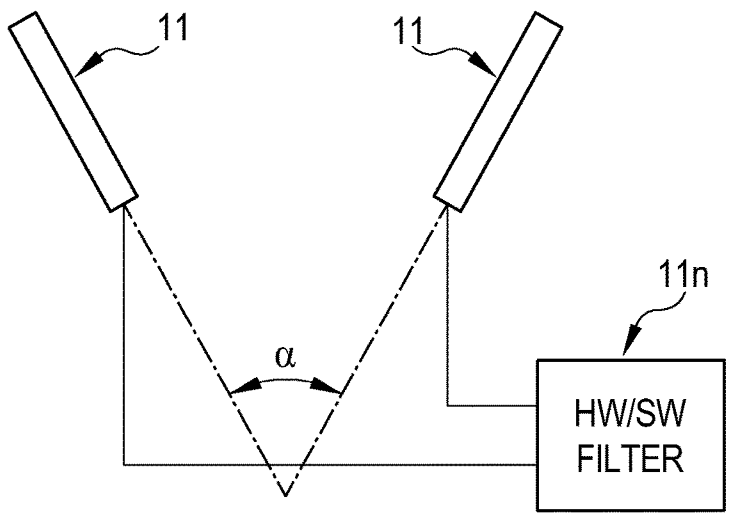
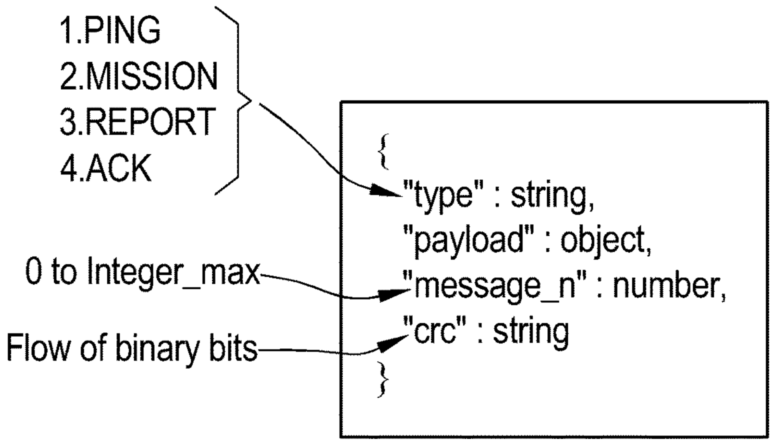
FIG.7
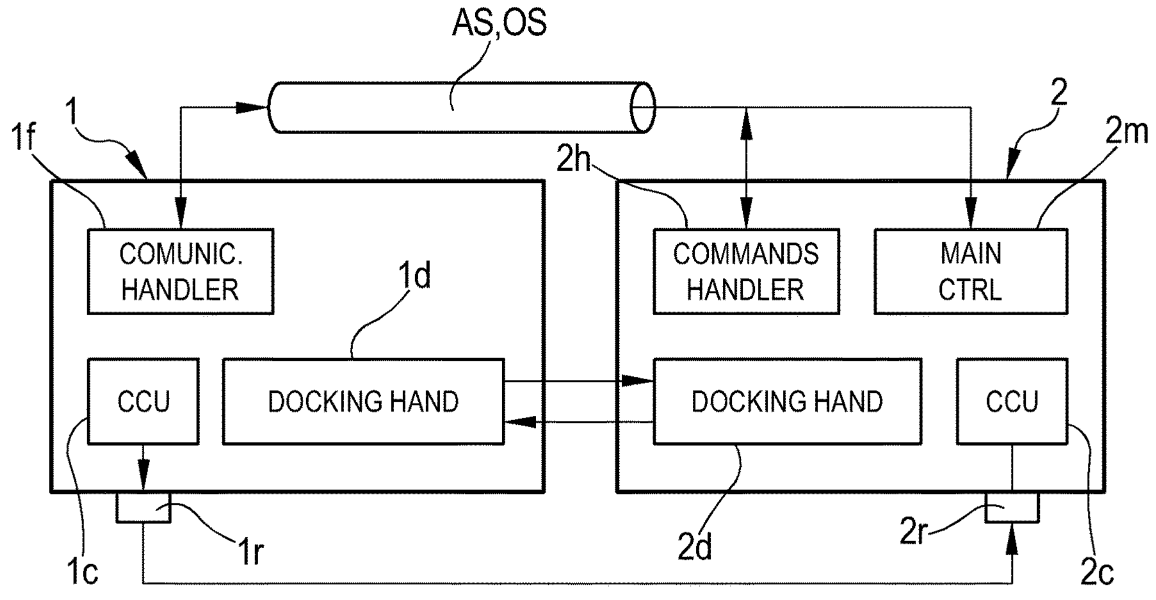
FIG.8

WIRELESS COMMUNICATION METHOD FOR AN UNDERWATER VEHICLE AND ASSOCIATED UNDERWATER SYSTEM

This application is a U.S. national stage application under 35 U.S.C. § 371(c) of International Application No. PCT/IB2022/020062, filed on Aug. 26, 2022, which claims priority to Italian Patent Application No. 102021000022481, filed on Aug. 27, 2021, the entire content each of which is incorporated by reference herein in its entirety.

FIELD OF THE ART

The present disclosure refers to the field of the communication protocols and to the field of the underwater devices.

In detail, the present disclosure relates to a wireless communication method, allowing a communication between a base station for an underwater vehicle and an underwater vehicle. The present disclosure further relates to an underwater system, in particular comprising at least one base station and at least one underwater vehicle.

BACKGROUND

Underwater vehicles are used for a wide variety of operations that include—but are not limited to—survey missions, samples picking, seabed imaging, mapping, and SAR applications. Underwater vehicles may be manned or unmanned. Among the unmanned vehicles there are ROVs and AUVs. ROVs (Remotely Operated Vehicles) are unmanned underwater vehicles connected to a base station which in this case is a ship. ROVs are connected to the ship by means of cables; this implies that the maximum achievable distance between the ROV and the base station is limited by the length of the cable. AUVs (Autonomous Underwater Vehicles) are unmanned underwater vehicles which are connected to a base station by means of a wireless communication. Typically AUVs are propelled through the energy stored in batteries housed in their body. This means that the operative range of an AUV is limited by the capacity of the battery.

Any underwater vehicle requiring the need of a wireless communication with the base station faces at least the problem of the limitations for wireless communications in water. It is known that radio frequencies are significantly attenuated in water. Above some hundreds of kHz, in particular above 1 MHz, attenuation in water raises significantly and any communication is affected by a link budget loss that limits the communication to some meters or less even with relevant transmission power and antenna gains. In particular above 1 MHz, attenuation in sea water raises with a more than linear law from 30 dB/m to reach about 60 dB/m at frequencies of about 10 MHz. Lower frequencies, that lay between the ELF (3-30 Hz) up to the LF (30 KHz-300 KHz) band, and that include acoustic and/or ultrasonic frequencies, are significantly less attenuated in water.

Exploiting low frequencies for signal transmission implies significant limitations in bandwidth, which may be so reduced that even the voice may have some problem to be transmitted. In practice, with LF frequencies, transmissions can take place at some hundreds of meters, while ELF transmissions can be effectively performed at longer distances.

It is known that underwater wireless communication may be performed by means of an optical communication. Optical communication is affected by water turbidity, and the performance of an effective communication is affected by the type of modulation used for the optical radiation. In any case, it is known that through the optical communications some tens of meters can be reached in seawater. Optical communication, due to the high frequency of the carrier(s), provides high bandwidth; such bandwidth is larger than the bandwidth achievable with the ultrasonic and/or acoustic signals.

The Applicant further notices that an effective control of complex underwater vehicles necessitates to provide commands and controls according to a predetermined scheme and protocols of operation. In particular, it is known that commands and protocols of operation may be provided with numeric signals or protocols, that with respect to analog signals or protocols allow a more flexible and effective programming and control of the underwater vehicles.

Object

The purpose of the present disclosure is to provide a wireless communication method and an underwater system that are conceived for overcoming the aforementioned drawbacks.

In particular, a purpose of the present disclosure is to provide a wireless communication method and an underwater system that allow a safe and reliable communication between an underwater vehicle and a respective base station, also for long distances.

A further purpose of the present disclosure is to provide a wireless communication method and an underwater system that allow to provide communication logic channels that may be switched according to specific needs, and/or that may be used as a backup in case of failure of one of the communication logic channels.

A further purpose of the present disclosure is to provide a wireless communication method and an underwater system that allow to transmit data, at least streaming and/or audio and/or video data, at a relatively high bandwidth, in particular without affecting the availability of bandwidth required for controlling the motion of the underwater vehicle with respect to the base station.

A further purpose of the present disclosure is to provide a wireless communication method and an underwater system that allow to effectively and safely control a wide range of operations performed by an underwater vehicle and/or to control the status of at least one between an underwater vehicle and a base station therefor.

SUMMARY

These and further purposes of the present disclosure are obtained by means of a wireless communication method and an underwater system as here disclosed.

Several principal aspects of the present disclosure will be hereinafter described. The following aspects can be combined together or with any part of the detailed description, in any suitable form.

Method

It is herewith disclosed a wireless communication method between a base station (1) for an underwater vehicle and an underwater vehicle (2), comprising:

- providing the base station (1) with at least a first hydrophone (11),
- providing the underwater vehicle (2), configured to be operatively coupled with the base station (1), with at least a second hydrophone (21), adapting and/or configuring the first hydrophone (11) and the second hydrophone (21) in order to allow a transmission and reception of ultrasonic and/or acoustic signals (AS), providing the base station (1) with at least a first optical communication device (12), and providing the underwater vehicle (2) with at least a second optical communication device (22), the first optical communication device (12) and the second optical communication device (22) comprising an optical transmitter and/or an optical receiver, the provision allowing setting up a signal transceiving between the base station (1) and the underwater vehicle (2), a step of transmission of at least one ultrasonic and/or acoustic signal (AS) by means of at least one between the first hydrophone (11) and the second hydrophone (21), and/or a step of transmission of at least one optical signal (OS) by means of at least one between the first optical communication device (12) and the second optical communication device (22).

According to a further non-limiting aspect, the method comprises controlling the underwater vehicle (2) as a slave unit, controlled by the base station (1) as a master unit by means of the step of transmission of at least one ultrasonic and/or acoustic signal (AS) and/or by means of the step of transmission of at least one optical signal (OS).

According to a further non-limiting aspect, the method comprises controlling the base station (1) as a slave unit, controlled by the underwater vehicle (2) as a master unit by means of the step of transmission of at least one ultrasonic and/or acoustic signal (AS) and/or by means of the step of transmission of at least one optical signal (OS).

According to a further non-limiting aspect, the method comprises providing a first underwater vehicle (2) and a second underwater vehicle (2) each configured to be operatively coupled with the base station (1), with at least a respective second hydrophone (21).

According to a further non-limiting aspect, the method comprises providing a first base station (1) with at least a first hydrophone (11) and a second base station (1) with at least a respective first hydrophone (11).

According to a further non-limiting aspect, the method comprises providing the first and the second base station (1) with at least a respective first optical communication device (12), and providing the underwater vehicle (2) with at least a second optical communication device (22), the first optical communication device (12) and the second optical communication device (22) comprising an optical transmitter and/or an optical receiver, the provision allowing setting up a signal transceiving between the first and the second base station (1) and the underwater vehicle (2).

According to a further non-limiting aspect, the method comprises providing the base station (1) with at least a first optical communication device (12), and providing the first and the second underwater vehicle (2) with at least a respective second optical communication device (22), the first optical communication device (12) and the second optical communication device (22) comprising an optical transmitter and/or an optical receiver, the provision allowing setting up a signal transceiving between the base station (1) and the underwater vehicle (2).

According to a further non-limiting aspect, the method comprises controlling the first and the second underwater vehicle (2) as slave units, controlled by the base station (1) as a master unit by means of the step of transmission of at least one ultrasonic and/or acoustic signal (AS) and/or by means of the step of transmission of at least one optical signal (OS).

According to a further non-limiting aspect, the method comprises controlling the first and the second base station (1) as slave units, controlled by the underwater vehicle (2) as a master unit by means of the step of transmission of at least one ultrasonic and/or acoustic signal (AS) and/or by means of the step of transmission of at least one optical signal (OS).

According to a further non-limiting aspect, the step of transmission of at least one ultrasonic and/or acoustic signal (AS) by means of the at least one between the first hydrophone (11) and the second hydrophone (21), and/or the step of transmission of at least one optical signal (OS) by means of at least one between the first optical communication device (12) and the second optical communication device (22) determine the control of the first and second underwater vehicle (2) according to a single master-multi slave protocol of control, the base station (1) acting as a master unit controlling the first and the second underwater vehicle (2) as slave units.

According to a further non-limiting aspect, the step of transmission of at least one ultrasonic and/or acoustic signal (AS) by means of the at least one between the first hydrophone (11) and the second hydrophone (21), and/or the step of transmission of at least one optical signal (OS) by means of at least one between the first optical communication device (12) and the second optical communication device (22) determine the control of the first and second base station (1) according to a single master-multi slave protocol of control, the underwater vehicle (2) acting as a master unit controlling the first and the second base stations (1) as slave units.

According to a further non-limiting aspect, the step of transmission of at least one ultrasonic and/or acoustic signal (AS) and/or the step of transmission of at least one optical signal (OS) comprise an at least temporary or partial serial transmission.

According to a further non-limiting aspect, the method comprises transmitting said ultrasonic and/or acoustic signal (AS) and/or the optical signal (OS) at least temporarily or partially serially.

According to a further non-limiting aspect, the method comprises at least:

a step of reception of at least one ultrasonic and/or acoustic signal (AS) by means of at least one between the first hydrophone (11) and the second hydrophone (21), and/or a step of reception of at least one optical signal (OS) by means of at least one between the first optical communication device (12) and the second optical communication device (22).

According to a further non-limiting aspect, the method is a full-duplex communication method wherein at least one between the step of transmission of at least one ultrasonic and/or acoustic signal (AS) by means of at least one between the first hydrophone (11) and the second hydrophone (21) and the step of reception of at least one ultrasonic and/or acoustic signal (AS) by means of at least one between the first hydrophone (11) and the second hydrophone (21), or the step of transmission of at least one optical signal (OS) by means of at least one between the first optical communication device (12) and the second optical communication device (22) and the step of reception of at least one optical signal (OS) by means of at least one between the first optical communication device (12) and the second optical communication device (22) take place simultaneously.

According to a further non-limiting aspect, the method comprises selecting an activation of the at least one between the first hydrophone (11) and the second hydrophone (21) and/or an activation of the at least one between the first optical communication device (12) and the second optical communication device (22).

According to a further non-limiting aspect, said selecting takes place in accordance to at least one predetermined criterion.

According to a further non-limiting aspect, said at least one predetermined criterion is a criterion of the following list: available and/or required bandwidth, distance between the base station (1) and the underwater vehicle (2), respective position between the base station (1) and the underwater vehicle (2), streaming requirement, control requirement.

According to a further non-limiting aspect, said predetermined criterion comprises at least identifying whether control and/or report command data or video and/or imaging and/or audio streaming data shall be transmitted and:

- if control and/or report command data shall be transmitted, performing the activation of at least one between the first hydrophone (11) and the second hydrophone (21) and/or the activation of at least one between the first optical communication device (12) and the second optical communication device (22);
- if video and/or imaging and/or audio streaming data shall be transmitted, performing the activation of at least one between the first optical communication device (12) and the second optical communication device (22).

According to a further non-limiting aspect, the transmission of at least one ultrasonic and/or acoustic signal (AS) is a substantially non-directive transmission and/or takes place when the base station (1) and the underwater vehicle (2) are at a first distance (D1) and/or wherein the transmission of at least one optical signal (OS) is a substantially directive transmission and/or takes place when the base station (1) and the underwater vehicle (2) are at a second distance (D2).

According to a further non-limiting aspect, the first distance (D1) is greater or equal to the second distance (D2).

According to a further non-limiting aspect, the second distance (D2) is lower than 100 m, preferably lower than 80 m, preferably lower than 60 m.

According to a further non-limiting aspect, the first distance (D1) is lower than 500 m, preferably lower than 300 m, preferably lower than 200 m.

According to a further non-limiting aspect, selecting an activation of at least one between the first hydrophone (11) and the second hydrophone (21) and/or an activation of at least one between the first optical communication device (12) and the second optical communication device (22) comprises measuring and/or electronically calculating a distance between the base station (1) and the underwater vehicle (2) and the activation of at least one between the first hydrophone (11) and the second hydrophone (21), or the step of transmission of at least one ultrasonic and/or acoustic signal (AS) by means of at least one between the first hydrophone (11) and the second hydrophone (21) takes place when the base station (1) and the underwater vehicle (2) are at a first distance (D1), and the activation of at least one between the first optical communication device (12) and the second optical communication device (22) and/or the step of transmission of at least one optical signal (OS) by means of at least one between the first optical communication device (12) and the second optical communication device (22) takes place when the base station (1) and the underwater vehicle (2) are at a second distance (D2).

According to a further non-limiting aspect, adapting and/or configuring the first hydrophone (11) and second hydrophone (21) in order to allow a transmission and reception of ultrasonic and/or acoustic signals (AS) comprises providing at least one between the first hydrophone (11) and the second hydrophone (21) with at least one between a vibrator (11*r*) and/or an amplifier (11*a*), the vibrator (11*r*) and/or the amplifier (11*a*) being specifically configured to allow the transmission of an ultrasonic and/or acoustic signal (AS), in particular an high power transmission of the ultrasonic and/or acoustic signal (AS).

According to a further non-limiting aspect, the step of transmission of at least one ultrasonic and/or acoustic signal (AS) by means of at least one between the first hydrophone (11) and the second hydrophone (21) comprises providing a signal to said vibrator and/or to said amplifier (11*a*) and/or to a piezoelectric transducer (11*p*) of said first hydrophone (11) and/or of said second hydrophone (21).

According to a further non-limiting aspect, the method comprises defining a plurality of frequency-spaced transmission channels (Ch1, Ch2, Ch3) of ultrasonic and/or acoustic signal transmission and the step of transmission of at least one ultrasonic and/or acoustic signal (AS) takes place on said plurality of frequency-spaced transmission channels (Ch1, Ch2, Ch3), in particular taking place simultaneously on said plurality of frequency-spaced transmission channels (Ch1, Ch2, Ch3) optionally wherein the step of transmission of the at least one ultrasonic and/or acoustic signal (AS) takes place according to a FSK modulation, or an ASK modulation, or a PSK modulation.

According to a further non-limiting aspect, the method comprises defining a plurality of frequency-spaced transmission channels (Ch1, Ch2, Ch3) of optical signal transmission, and the step of transmission of said optical signal (OS) takes place on said plurality of frequency-spaced transmission channels (Ch1, Ch2, Ch3), in particular taking place simultaneously on said plurality of frequency-spaced transmission channels (Ch1, Ch2, Ch3) optionally wherein the step of transmission of said optical signal (OS) takes place according to a FSK modulation, or an ASK modulation, or a PSK modulation.

According to a further non-limiting aspect, the step of transmission of the at least one between the ultrasonic and/or acoustic signal (AS) and the optical signal (OS) is a step of transmission of a numeric signal.

According to the present disclosure, with "numeric signal" it is meant a digital signal. Said digital signal may be a binary signal.

According to a further non-limiting aspect, the at least one between the ultrasonic and/or acoustic signal (AS) and the optical signal (OS) comprises a plurality of 0s and 1s and the step of transmission of the at least one between ultrasonic and/or acoustic signal (AS) and/or the optical signal (OS) according to the FSK modulation comprises modulating the 0s and the 1s respectively on a first and a second carrier frequency spaced one with respect to the other, said first and second carrier frequencies being spaced of a predefined guard interval.

According to a further non-limiting aspect, the step of transmission of the at least one between the ultrasonic and/or acoustic signal (AS) and the optical signal (OS) comprises transmitting a plurality of 0s and 1s.

According to a further non-limiting aspect, the method comprises using the first data channel (Ch1) for transmitting the 0s, and the second data channel (Ch2) for transmitting the 1s.

According to a further non-limiting aspect, the at least one optical signal (OS) comprises a plurality of 0s and 1s and the step of transmission of the optical signal (OS) according to the FSK modulation comprises modulating the 0s and the 1s respectively on a first and a second carrier frequency spaced one with respect to the other, said first and second carrier frequencies being spaced of a predefined guard interval.

According to a further non-limiting aspect, the method comprises adapting the predefined guard interval and/or adapting said first and/or second carrier frequency.

According to a further non-limiting aspect, the guard interval is at least 5 kHz or at least 10 kHz.

According to a further non-limiting aspect, the method comprises performing a synchronization of the control and/or of the motion of the underwater vehicle (2) with respect to the base station (1),

- the synchronization taking place by means of the ultrasonic and/or acoustic signal (AS),
- the step of transmission of at least one ultrasonic and/or acoustic signal (AS) comprising transmitting control and/or motion data on at least one data channel (Ch1, Ch2) of the plurality of frequency-spaced transmission channels (Ch1, Ch2, Ch3) and/or comprising transmitting synchronization data on at least one synchronization channel (Ch3) of the plurality of frequency-spaced transmission channels (Ch1, Ch2, Ch3).

According to a further non-limiting aspect, the step of transmission of at least one ultrasonic and/or acoustic signal (AS) is a step of at least partially asynchronous transmission.

According to a further non-limiting aspect, the step of transmission of at least one ultrasonic and/or acoustic signal (AS) comprises transmitting asynchronously part of said ultrasonic and/or acoustic signal (AS) on one data channel (Ch1, Ch2) of the plurality of frequency-spaced transmission channels (Ch1, Ch2, Ch3) and comprises a transmission of a synchronizing ultrasonic and/or acoustic signal (AS) on the at least one synchronization channel (Ch3) of the plurality of frequency-spaced transmission channels (Ch1, Ch2, Ch3).

According to a further non-limiting aspect, the ultrasonic and/or acoustic signal (AS) comprises a noise portion and a payload portion, the method comprising a step of underwater noise mitigation, for reducing the noise portion and/or increasing a signal-to-noise ratio of the ultrasonic and/or acoustic signal (AS).

According to a further non-limiting aspect, the underwater noise mitigation comprises at least one among:

- selecting, optionally automatically, a frequency range for transmitting the ultrasonic and/or acoustic signal (AS), the frequency range being far from underwater noise sources;
- providing the base station (1) with at least a first plurality of hydrophones (11), and/or providing the underwater vehicle (2) with a second plurality of hydrophones (21) and simultaneously receiving the ultrasonic and/or acoustic signal (AS) with the first plurality of hydrophones (11) and with the second plurality of hydrophones (21), the first plurality of hydrophones (11) and/or the second plurality of hydrophones (21) comprising hydrophones arranged at different positions and/or at different angles;
- electronically processing a received ultrasonic and/or acoustic signal (AS) by means of noise mitigation software and/or hardware, performing at least one of the signals processing techniques of the following list: a frequency-based noise mitigation processing, in particular a Fast Fourier Transform noise mitigation processing; a matrix factorization noise mitigation processing; an adaptive and/or predictive filtering for noise mitigation.

According to a further non-limiting aspect, the step of transmission of at least one between said ultrasonic and/or acoustic signal (AS) and said optical signal (OS) is a step of transmission of a numeric signal, optionally a binary and/or a packet-type numeric signal, comprising a message having a structure comprising at least one of the fields of the following list: a command type field, containing data relating to the type of command provided to, or received by, the underwater vehicle (2); a payload field, containing data associated to said type of command provided to, or received by, the underwater vehicle (2); a message number identification field; a checksum field.

According to a further non-limiting aspect, the method comprises providing at least one between the base station (1) and/or the underwater vehicle (2) with at least one position and/or direction sensing element configured to provide indication of a position and/or orientation respectively of the base station (1) and/or of the underwater vehicle (2).

According to a further non-limiting aspect, the method comprises providing an authorization to charge a battery of the underwater vehicle (2) by means of a first recharging connector (1*r*) of the base station (1), optionally by means of a first wireless recharging connector of the base station (1), the first recharging connector (1*r*) being configured for transferring electric energy to the underwater vehicle (2).

According to a further non-limiting aspect, the method comprises controlling at least one motor (2*m*) of the underwater vehicle (2) for allowing the motion of the underwater vehicle (2) in water, the controlling taking place in accordance to said ultrasonic and/or acoustic signal (AS) and/or in accordance to said optical signal (OS).

According to a further non-limiting aspect, the method comprises controlling the underwater vehicle (2) by means of the base station (1), optionally comprising wirelessly controlling the underwater vehicle (2) by means of the base station (1); such controlling comprising optionally controlling an approach and/or a positioning of the underwater vehicle (2) relative to the base station (1).

According to a further non-limiting aspect, the method comprises transferring energy from the first recharging connector (1*r*) to a second recharging connector (2*r*) installed on the underwater vehicle (2); the second recharging connector (2*r*) optionally being a second wireless recharging connector; the second recharging connector (2*r*) being configured for receiving the electric energy in use transferred by means of the first recharging connector (1*r*); the method comprising transferring the energy from the second recharging connector (2*r*) to the battery.

According to a further non-limiting aspect, the method comprises acquiring at least one position and/or orientation of the base station (1) and/or of the underwater vehicle (2) by means of said at least one position and/or direction sensing element, optionally at least a radiofrequency positioning sensor and/or a pitometer, and/or a magnetic and/or inertial compass.

According to a further non-limiting aspect, acquiring at least one position and/or orientation of the base station (1) and/or of the underwater vehicle (2) comprises receiving at least one position and/or orientation signal, optionally at least one electronic position and/or orientation signal, from the position and/or direction sensing element.

According to a further non-limiting aspect, the at least a radiofrequency positioning sensor comprises at least a global positioning satellite system positioning sensor.

According to a further non-limiting aspect, acquiring said at least one position comprises activating and/or electronically interrogating the radiofrequency positioning sensor and providing the position and/or orientation signal showing an absolute position of the base station (1) and/or of the underwater vehicle (2) with respect to a fixed earth coordinate system or a relative position, assumed by the base station (1) and/or by the underwater vehicle (2) relative to a movable reference point, in particular relative to a position at least temporarily assumed respectively by the underwater vehicle (2) or the base station (1).

According to a further aspect, it is herewith disclosed a wireless communication method between a base station (1) for an underwater vehicle and an underwater vehicle (2), comprising:

- providing the base station (1) with at least a first hydrophone (11),
- providing the underwater vehicle (2), configured to be operatively coupled with the base station (1), with at least a second hydrophone (21),
- providing the base station (1) with at least a first optical communication device (12), and providing the underwater vehicle (2) with at least a second optical communication device (22), the first optical communication device (12) and the second optical communication device (22) comprising an optical transmitter and/or an optical receiver, the provision allowing setting up a signal transceiving between the base station (1) and the underwater vehicle (2),
- a step of transmission of at least one ultrasonic and/or acoustic signal (AS), and/or
- a step of transmission of at least one optical signal (OS) by means of at least one between the first optical communication device (12) and the second optical communication device (22).
- wherein the step of transmission of at least one between said ultrasonic and/or acoustic signal (AS) and said optical signal (OS) is a step of transmission of a numeric signal, optionally a binary and/or a packet-type numeric signal, comprising a message having a structure including at least one of the fields of the following list: a command type field, containing data relating to the type of command provided to, or received by, one between the base station (1) or the underwater vehicle (2); a payload field, containing data associated to said type of command provided to, or received by, one between the base station (1) or underwater vehicle (2); a message number identification field; a checksum field.

According to a further aspect, it is herewith disclosed a wireless communication method between a base station (1) for an underwater vehicle and an underwater vehicle (2), comprising:

- providing the base station (1) with at least a first hydrophone (11),
- providing the underwater vehicle (2), configured to be operatively coupled with the base station (1), with at least a second hydrophone (21),
- a step of transmission of at least one ultrasonic and/or acoustic signal (AS),
- wherein the step of transmission of said ultrasonic and/or acoustic signal (AS) is a step of transmission of a numeric signal, optionally a binary and/or a packet-type numeric signal, comprising a message having a structure including at least one of the fields of the following list: a command type field, containing data relating to the type of command provided to, or received by, one between the base station (1) or the underwater vehicle (2); a payload field, containing data associated to said type of command provided to, or received by, one between the base station (1) or underwater vehicle (2); a message number identification field; a checksum field.

According to a further non-limiting aspect, the method comprises providing the base station (1) with at least a first optical communication device (12), and providing the underwater vehicle (2) with at least a second optical communication device (22), the first optical communication device (12) and the second optical communication device (22) comprising an optical transmitter and/or an optical receiver, the provision allowing setting up a signal transceiving between the base station (1) and the underwater vehicle (2).

According to a further non-limiting aspect, the method comprises a step of transmission of at least one optical signal (OS) by means of at least one between the first optical communication device (12) and the second optical communication device (22).

According to a further non-limiting aspect, the step of transmission of the at least one optical signal (OS) is a step of transmission of a numeric signal, optionally a binary and/or a packet-type numeric signal, comprising a message having a structure including at least one of the fields of the following list: a command type field, containing data relating to the type of command provided to, or received by, one between the base station (1) or the underwater vehicle (2); a payload field, containing data associated to said type of command provided to, or received by, one between the base station (1) or underwater vehicle (2); a message number identification field; a checksum field.

According to a further non-limiting aspect, the method comprises a step of configuration and/or motion and/or actuation of at least one between the base station (1) or the underwater vehicle (2), said step of configuration and/or motion and/or actuation comprising an electronic processing of said message and adapting a configuration and/or a motion and/or an actuation of said at least one between the base station (1) or the underwater vehicle (2) in accordance to the electronic processing of said message.

According to a further non-limiting aspect, the method comprises adapting and/or configuring the first hydrophone (11) and the second hydrophone (21) in order to allow a transmission and reception of ultrasonic and/or acoustic signals (AS) and the step of transmission of at least one ultrasonic and/or acoustic signal (AS) takes place by means of at least one between the first hydrophone (11) and the second hydrophone (21).

According to a further non-limiting aspect, the method comprises providing in the command type field numeric data used to identify or control whether at least one between the base station (1) or the underwater vehicle (2) is responsive.

According to a further non-limiting aspect, the method comprises providing in the command type data at least one of the commands of the following list:

- a “ping” type command, configured to cause the base station (1) or the underwater vehicle (2) to provide a response, in particular an automated response, to the “ping” type command;

an "acknowledgement" type command, in use provided by one between the base station (1) or the underwater vehicle (2) which has been enquired by a "ping" type command or in use following, optionally immediately following, an enquiry provided to one between the base station (1) or the underwater vehicle (2) by means of a "ping" type command;

a numeric type command, identifying a mission and/or a report of mission carried out by one between the base station (1) or the underwater vehicle (2).

According to a further non-limiting aspect, the method comprises providing a response to the "ping" type command, the response being performed by one between the base station (1) or the underwater vehicle (2) having received said "ping" type command.

According to a further non-limiting aspect, the provision of said response comprises sending an "acknowledgement" type command to the one between the base station (1) or the underwater vehicle (2) having transmitted said "ping" type command.

According to a further non-limiting aspect, the method comprises providing to the payload field data associated to the type of command provided to, or received by, one between the base station (1) or the underwater vehicle (2), said data comprising at least one between the data types of the following list: an object data type, a string data type, an array data type.

According to a further non-limiting aspect, the method comprises providing in the data of the payload field at least one of the data of the following list:

location data, optionally of an object data type, the location data containing coordinates at which the underwater vehicle (2) and/or the base station (1) shall direct or at which the underwater vehicle (2) and/or the base station (1) actually is;

battery level data, optionally of a string data type, the battery level data being indicative of a charge level of a battery of one between the underwater vehicle (2) or the base station (1);

status data, optionally of a string data type, the status data expressing a status of one between the base station (1) or the underwater vehicle (2), in particular a status of one between the base station (1) or the underwater vehicle (2) having, in use, received a "acknowledgement" type command;

commands data, optionally of an array data type, the commands data containing at least one specific command to one between the base station (1) or the underwater vehicle (2), optionally wherein said commands data cause, in use, a control or an imposition of a motion to a specific direction or coordinates set provided with the location data;

skipping data, optionally of an array data type, the skipping data allowing one between the base station (1) or the underwater vehicle (2) to skip a message wherein the skipping data is contained, commands report data, optionally of an array data type, the commands report data being configured to identify whether a previously sent command has been executed by one between the base station (1) or the underwater vehicle (2) and/or being configured to identify a result of a previous command sent by one between the base station (1) or the underwater vehicle (2);

sequence number data, optionally of a number data type, the sequence number data being configured to identify whether one between the base station (1) or the underwater vehicle (2) has received in use a plurality of commands data to identify a specific order of the command data.

According to a further non-limiting aspect, the method comprises associating the position and/or orientation signal, in particular data contained in the position and/or orientation signal, to said location data.

According to a further non-limiting aspect, the method comprises providing in the status data at least one of the data of the following list:

"doing mission" data, configured to indicate that one between the base station (1) or the underwater vehicle (2) is performing a specific imposed command or activity;

"searching" data, configured to indicate that one between the base station (1) and the underwater vehicle (2) to which a command has already been sent, is performing a search according to at least one parameter, preferably a plurality of parameters;

"lost" data, configured to indicate that one between the base station (1) or the underwater vehicle (2) has lost his position and/or has failed to reach a specified destination specified by the location data;

"returning home" data, configured to indicate that one between the base station (1) or the underwater vehicle (2) is approaching the other between the base station (1) or the underwater vehicle (2);

"heading to mission" data, configured to indicate that one between the base station (1) or the underwater vehicle (2) is approaching a location specified by the location data;

"emergency" data, configured to indicate a malfunction of one between the base station (1) or the underwater vehicle (2) and/or an immediate suspension of any activity performed by one between the base station (1) or the underwater vehicle (2).

According to a further non-limiting aspect, the method comprises providing the commands data with a plurality of portions; the plurality of portions comprising at least one between the portions of the following list: an action portion configured to identify a specific action that the one between the base station (1) or the underwater vehicle (2) shall perform; a parameter portion comprising data associated to said specific action, in particular metric data associated to the specific action; an adjective portion, comprising data associated to the data of the parameter portion; an object portion, containing data referring to a destination of a motion or of an action carried out by one of the base station (1) or the underwater vehicle (2).

According to a further non-limiting aspect, providing the base station (1) with at least a first hydrophone (11) and providing the base station (1) with at least a first optical communication device (12) comprises arranging an axis of transmission and/or reception (X) of the first hydrophone (11) and an axis of alignment of the first optical communication device (12) along a parallel direction, and/or providing the underwater vehicle (2) with at least a second hydrophone (21) and providing the underwater vehicle (2) with at least a second optical communication device (12) comprises arranging an axis of transmission and/or reception (X) of the second hydrophone (21) and an axis of alignment of the second optical transmission device (22) along a parallel direction.

According to a further non-limiting aspect, providing the base station (1) with a first plurality of hydrophones (11) and providing the base station (1) with at least a first optical communication device (12) comprises arranging an axis of transmission and/or reception (X) of at least one first hydrophone (11) of the first plurality of hydrophones (11) and an axis of alignment of the first optical communication device (12) along a parallel direction, and comprises arranging an axis of transmission and/or reception (X) of at least one second hydrophone (11) of the first plurality of hydrophones (11) and the axis of alignment of the first optical communication device (12) along different directions, and/or providing the underwater vehicle (2) with a second plurality of hydrophones (21) and providing the underwater vehicle (2) with at least a second optical communication device (22) comprises arranging an axis of transmission and/or reception (X) of at least one first hydrophone (21) of the second plurality of hydrophones (21) and an axis of alignment of the second optical communication device (22) along a parallel direction, and comprises arranging an axis of transmission and/or reception (X) of at least one second hydrophone (21) of the second plurality of hydrophones (21) and the axis of alignment of the second optical communication device (22) along different directions.

According to a further non-limiting aspect, the method comprises actuating at least one actuator for controlling and/or moving an axis of transmission and/or reception of the first optical communication device (12) and/or of the second optical communication device (22).

According to a further non-limiting aspect, the axis of transmission and/or reception comprises said axis of alignment.

According to a further non-limiting aspect, the method comprises a step of encryption of data according to a predetermined encryption algorithm, and the step of transmission of at least one ultrasonic and/or acoustic signal (AS) and/or the step of transmission of at least one optical signal (OS) is a step of transmission of an encrypted ultrasonic and/or acoustic signal (AS) and/or a step of transmission of an encrypted optical signal (OS).

According to a further aspect, the method comprises selecting between at least a first or a second algorithm of data encryption, one between said first or second algorithm of data encryption becoming said predetermined encryption algorithm.

According to a further non-limiting aspect, the method comprises a step of encryption and decryption algorithm synchronization, taking place between at least one base station (1) and at least one underwater vehicle (2), or between at least a first and a second base station (1) and/or between at least a first and a second underwater vehicle (2); the step of encryption and decryption algorithm synchronization determining the decryption of any between the encrypted ultrasonic and/or acoustic signal (AS) and/or encrypted optical signal (OS) with a decryption algorithm corresponding to said predetermined encryption algorithm.

System

According to a further non-limiting aspect, it is herewith disclosed an underwater system comprising:

- at least one base station (1) for an underwater vehicle (2) comprising:
  - at least a first hydrophone (11), adapted and/or configured for transmitting and receiving ultrasonic and/or acoustic signals (AS),
  - at least a first optical communication device (12), comprising an optical transmitter and/or an optical receiver,
- at least one underwater vehicle (2), configured to be operatively coupled with the base station (1), comprising:
  - at least a second hydrophone (21), adapted and/or configured for transmitting and receiving ultrasonic and/or acoustic signals (AS),
  - at least a second optical communication device (22), comprising an optical transmitter and/or an optical receiver, wherein at least one between the first optical communication device (12) and the second optical communication device (22) is configured to transmit at least one optical signal (OS) and wherein at least one between the first optical communication device (12) and the second optical communication device (22) is configured to receive said optical signal (OS).

According to a further non-limiting aspect, the underwater vehicle (2) is a slave unit, configured to be controlled by the base station (1) as a master unit by said ultrasonic and/or acoustic signal (AS) and/or by said optical signal (OS).

According to a further non-limiting aspect, the system comprises a first underwater vehicle (2) and a second underwater vehicle (2), each configured to be operatively coupled with the base station (1), and comprising:

- at least a second hydrophone (21), adapted and/or configured for transmitting and receiving ultrasonic and/or acoustic signals (AS),
- at least a second optical communication device (22), comprising an optical transmitter and/or an optical receiver.

According to a further non-limiting aspect, the system comprises a first and a second base station (1) for an underwater vehicle (2), each of said first and second base station (1) comprising:

- at least a first hydrophone (11), adapted and/or configured for transmitting and receiving ultrasonic and/or acoustic signals (AS),
- at least a first optical communication device (12), comprising an optical transmitter and/or an optical receiver.

According to a further non-limiting aspect, the underwater vehicle (2) is a master unit, configured to control the first and the second base station (1) as slave stations by said ultrasonic and/or acoustic signal (AS) and/or by said optical signal (OS).

According to a further non-limiting aspect, the ultrasonic and/or acoustic signal (AS) and/or the optical signal (OS) may be at least temporarily or partially serial signals.

According to a further non-limiting aspect, the base station (1) is a docking station for said underwater vehicle (2). According to a further non-limiting aspect, at least the base station (1) is configured to receive at least one ultrasonic and/or acoustic signal (AS) by means of the at least a first hydrophone (11), and/or is configured to receive at least one optical signal (OS) by means of the at least one first optical communication device (12) and/or the underwater vehicle (2) is configured to receive at least one ultrasonic and/or acoustic signal (AS) by means of the at least a second hydrophone (21) and the second hydrophone (21), and/or is configured to receive at least one optical signal (OS) by means of the at least one second optical communication device (22).

According to a further non-limiting aspect, the system is a full-duplex communication system, wherein at least one between the base station (1) and the underwater vehicle (2) is configured to simultaneously transmit and receive an ultrasonic and/or acoustic signal (AS) and/or to simultaneously transmit and receive an optical signal (OS).

According to a further non-limiting aspect, the system comprises a hardware and/or software selector configured for selecting an activation of at least one between the first hydrophone (11) and the second hydrophone (21) and/or an activation of at least one between the first optical communication device (12) and the second optical communication device (22).

According to a further non-limiting aspect, said selector is configured to select said activation in accordance to at least one predetermined criterion.

According to a further non-limiting aspect, said one predetermined criterion is a criterion of the following list: available and/or required bandwidth, distance between the base station (1) and the underwater vehicle (2), respective position between the base station (1) and the underwater vehicle (2), streaming requirement, control requirement.

According to a further non-limiting aspect, the selector is configured to identify whether control and/or report command data or video and/or imaging and/or audio streaming data shall be transmitted and:

- if control and/or report command data shall be transmitted, said selector causes the activation of at least one between the first hydrophone (11) and the second hydrophone (21) and/or the activation of at least one between the first optical communication device (12) and the second optical communication device (22);
- if video and/or imaging and/or audio streaming data shall be transmitted, said selector causes the activation of at least one between the first optical communication device (12) and the second optical communication device (22).

According to a further non-limiting aspect, at least one between the first hydrophone (11) and the second hydrophone (21) comprises a vibrator (11*r*) and/or an amplifier (11*a*), the vibrator (11*r*) and/or the amplifier (11*a*) is specifically configured to allow the transmission of an ultrasonic and/or acoustic signal (AS), in particular an high power transmission of the ultrasonic and/or acoustic signal (AS).

According to a further non-limiting aspect, the ultrasonic and/or acoustic signal (AS) lies in the [20-150] kHz frequency range, preferably in the [30-110] kHz frequency range.

According to a further non-limiting aspect, the system, optionally the selector, is configured to cause the transmission of at least one ultrasonic and/or acoustic signal (AS) when the base station (1) and the underwater vehicle (2) are at a first distance (D1) and/or to cause the transmission of at least one optical signal (OS) when the base station (1) and the underwater vehicle (2) are at a second distance (D2).

According to a further non-limiting aspect, at least one between the base station (1) and the underwater vehicle (2) is configured to provide a signal to said vibrator (11*r*) and/or to said amplifier (11*a*) and/or to a piezoelectric transducer (11*p*) of said first hydrophone (11) and/or of said second hydrophone (21).

According to a further non-limiting aspect, the base station (1) and the underwater vehicle (2) are configured to transmit the ultrasonic and/or acoustic signal (AS) on a plurality of frequency-spaced transmission channels (Ch1, Ch2, Ch3), optionally simultaneously on said plurality of frequency-spaced transmission channels (Ch1, Ch2, Ch3), optionally being configured to modulate, and subsequently to transmit, the at least one ultrasonic and/or acoustic signal (AS) according to a FSK modulation, or an ASK modulation, or a PSK modulation.

According to a further non-limiting aspect, the base station (1) and the underwater vehicle (2) are configured to transmit the optical signal (OS) on a plurality of frequency-spaced transmission channels (Ch1, Ch2, Ch3), optionally simultaneously on said plurality of frequency-spaced transmission channels (Ch1, Ch2, Ch3), optionally being configured to modulate, and subsequently to transmit, the at least one optical signal (OS) according to a FSK modulation, or an ASK modulation, or a PSK modulation.

According to a further non-limiting aspect, at least one between the ultrasonic and/or acoustic signal (AS) and the optical signal (OS) is a numeric signal.

According to a further non-limiting aspect, the at least one between the ultrasonic and/or acoustic signal (AS) and the optical signal (OS) comprises a plurality of 0s and 1s and the FSK modulation comprises modulating the 0s and the 1s respectively on a first and a second carrier frequency spaced one with respect to the other, said first and second carrier frequencies being spaced of a predefined guard interval.

According to a further non-limiting aspect, at least one between the ultrasonic and/or acoustic signal (AS) and the optical signal (OS) comprises a plurality of 0s and 1s.

According to a further non-limiting aspect, the first data channel (Ch1) is used for transmitting the 0s, the second data channel (Ch2) is used for transmitting the 1s.

According to a further non-limiting aspect, the at least one optical signal (OS) comprises a plurality of 0s and 1s and the FSK modulation comprises modulating the 0s and the 1s respectively on a first and a second carrier frequency spaced one with respect to the other, said first and second carrier frequencies being spaced of a predefined guard interval.

According to a further non-limiting aspect, at least one between the base station (1) and the underwater vehicle (2) is configured to adapt the predefined guard interval and/or to adapt the first and/or the second carrier frequency.

According to a further non-limiting aspect, the guard interval is at least 5 kHz or at least 10 kHz.

According to a further non-limiting aspect, said plurality of frequency-spaced transmission channels (Ch1, Ch2, Ch3) comprises at least one data channel (Ch1, Ch2) and at least one synchronization channel (Ch3).

According to a further non-limiting aspect, the at least one data channel (Ch1, Ch2) is configured to allow transceiving of control and/or motion data.

According to a further non-limiting aspect, the at least one data channel (Ch1, Ch2) comprises a first data channel (Ch1) and a second data channel (Ch2).

According to a further non-limiting aspect, the first data channel (Ch1) is spaced in frequency from said second data channel (Ch2).

According to a further non-limiting aspect, the base station (1) and the underwater vehicle (2) are configured to keep a synchronization of transmission of ultrasonic and/or acoustic signals (AS) on said at least one data channel (Ch1, Ch2) by means of data contained in an ultrasonic and/or acoustic signal (AS) transmitted on the synchronization channel (Ch3).

According to a further non-limiting aspect, at least part of said ultrasonic and/or acoustic signal (AS) is asynchronous.

According to a further non-limiting aspect, at least one between the base station (1) and the underwater vehicle (2) is configured to transmit at least part of said ultrasonic and/or acoustic signal (AS), preferably the ultrasonic and/or acoustic signal (AS) transceived on said at least one data channel (Ch1, Ch2) asynchronously or according to an asynchronous protocol and is configured to transmit a synchronizing ultrasonic and/or acoustic signal (AS) on the at least one synchronization channel (Ch3) of the plurality of frequency-spaced transmission channels (Ch1, Ch2, Ch3).

According to a further non-limiting aspect, the base station (1) comprises a first plurality of hydrophones (11) and/or the underwater vehicle (2) comprises a second plurality of hydrophones (21).

According to a further non-limiting aspect, said first plurality of hydrophones (11), and/or said second plurality of hydrophones (21), is arranged at different positions and/or at different angles.

According to a further non-limiting aspect, at least one between the base station (1) and the underwater vehicle (2) comprises a noise mitigation software and/or hardware stage, configured for performing at least one of the signals processing techniques of the following list: a frequency-based noise mitigation processing, in particular a Fast Fourier Transform noise mitigation processing; a matrix factorization noise mitigation processing; an adaptive and/or predictive filtering for noise mitigation.

According to a further non-limiting aspect, the base station (1) is a docking station for said underwater vehicle (2).

According to a further non-limiting aspect, the base station (1) comprises a first recharging connector (1*r*), optionally a first wireless recharging connector, configured for transferring electric energy to the underwater vehicle (2).

According to a further non-limiting aspect, the underwater vehicle (2) is an unmanned underwater vehicle (2), provided with at least one motor (2*m*), optionally an electric motor, for allowing the motion of the underwater vehicle (2) in water.

According to a further non-limiting aspect, the underwater vehicle (2) is wirelessly controlled by means of the base station (1).

According to a further non-limiting aspect, the underwater vehicle (2) comprises at least one battery and a second recharging connector (2*r*), optionally a second wireless recharging connector, configured for receiving the electric energy in use transferred by means of the first recharging connector (1*r*) and for transferring said electric energy to the battery.

According to a further non-limiting aspect, an approach and/or a positioning of the underwater vehicle (2) relative to the base station (1) is controlled by means of at least one between the optical signal (OS) and the ultrasonic and/or acoustic signal (AS).

According to a further non-limiting aspect, the base station (1) and/or the underwater vehicle (2) comprises at least one position and/or direction sensing element configured to transmit at least one position and/or orientation signal, optionally at least one electronic position and/or orientation signal, indicating a position and/or orientation respectively of the base station (1) and/or of the underwater vehicle (2).

According to a further non-limiting aspect, said at least one position and/or direction sensing element comprises at least a radiofrequency positioning sensor, in particular a global positioning satellite system positioning sensor, and/or a pitometer, and/or a magnetic and/or inertial compass.

According to a further non-limiting aspect, the radiofrequency positioning sensor is configured to provide electronic positioning data showing an absolute position of the base station (1) and/or of the underwater vehicle (2) with respect to a fixed earth coordinate system or a relative position, assumed by the base station (1) and/or by the underwater vehicle (2) relative to a movable reference point, in particular relative to a position at least temporarily assumed respectively by the underwater vehicle (2) or the base station (1).

According to a further aspect, it is herewith disclosed an underwater system comprising:

- a base station (1) for an underwater vehicle (2) comprising:
- at least a first hydrophone (11),
- at least a first optical communication device (12), comprising an optical transmitter and/or an optical receiver,
- an underwater vehicle (2), configured to be operatively coupled with the base station (1), comprising:
- at least a second hydrophone (21),
- at least a second optical communication device (22), comprising an optical transmitter and/or an optical receiver,
- wherein at least one between the first optical communication device (12) and the second optical communication device (22) is configured to transmit at least one optical signal (OS) and wherein at least one between the first optical communication device (12) and the second optical communication device (22) is configured to receive said optical signal (OS), and
- wherein the system is configured to transmit at least one between said ultrasonic and/or acoustic signal (AS) and said optical signal (OS) with a message comprising at least one of the fields of the following list: a command type field, containing data relating to the type of command provided to, or received by, one between the base station (1) or the underwater vehicle (2); a payload field, containing data associated to said type of command provided to, or received by, the base station (1) or the underwater vehicle (2); a message number identification field; a checksum field.

According to a further aspect, it is herewith disclosed an underwater system comprising:

- a base station (1) for an underwater vehicle (2) comprising at least a first hydrophone (11),
- an underwater vehicle (2), configured to be operatively coupled with the base station (1), comprising at least a second hydrophone (21),
- the system being configured to transmit said ultrasonic and/or acoustic signal (AS) with a message comprising at least one of the fields of the following list: a command type field, containing data relating to the type of command provided to, or received by, one between the base station (1) or the underwater vehicle (2); a payload field, containing data associated to said type of command provided to, or received by, the base station (1) or the underwater vehicle (2); a message number identification field; a checksum field.

According to a further non-limiting aspect, the base station (1) comprises at least a first optical communication device (12), comprising an optical transmitter and/or an optical receiver, and the underwater vehicle (2) comprising at least a second optical communication device (22), comprising an optical transmitter and/or an optical receiver,

- wherein at least one between the first optical communication device (12) and the second optical communication device (22) is configured to transmit at least one optical signal (OS) and wherein at least one between the first optical communication device (12) and the second optical communication device (22) is configured to receive said optical signal (OS).

According to a further non-limiting aspect, the system is configured to transmit said optical signal (OS) with a message comprising at least one of the fields of the following list: a command type field, containing data relating to the type of command provided to, or received by, one between the base station (1) or the underwater vehicle (2); a payload field, containing data associated to said type of command provided to, or received by, the base station (1) or the underwater vehicle (2); a message number identification field; a checksum field.

According to a further non-limiting aspect, the first hydrophone (11) and the second hydrophone (21) are adapted and/or configured for transmitting and receiving ultrasonic and/or acoustic signals (AS).

According to a further non-limiting aspect, the command type field contains numeric data used to identify or control whether at least one between the base station (1) or the underwater vehicle (2) is responsive.

According to a further non-limiting aspect, the command type data comprise at least one of the commands of the following list:

a "ping" type command, configured to cause the base station (1) or the underwater vehicle (2) to provide a response, in particular an automated response, to the "ping" type command;

an "acknowledgement" type command, in use provided by one between the base station (1) or the underwater vehicle (2) which has been enquired by a "ping" type command or in use following, optionally immediately following, an enquiry provided to one between the base station (1) or the underwater vehicle (2) by means of a "ping" type command;

a numeric type command, identifying a mission and/or a report of mission carried out by one between the base station (1) or the underwater vehicle (2).

According to a further non-limiting aspect, the payload field contains data associated to the type of command provided to, or received by, one between the base station (1) or the underwater vehicle (2), said data comprising at least one between the data types of the following list: an object data type, a string data type, an array data type.

According to a further non-limiting aspect, the data of the payload field comprise at least one of the data of the following list:

location data, optionally of an object data type, the location data containing coordinates at which the underwater vehicle (2) and/or the base station (1) shall direct or at which the underwater vehicle (2) and/or the base station (1) actually is;

battery level data, optionally of a string data type, the battery level data being indicative of a charge level of a battery of one between the underwater vehicle (2) or the base station (1);

status data, optionally of a string data type, the status data expressing a status of one between the base station (1) or the underwater vehicle (2), in particular a status of one between the base station (1) or the underwater vehicle (2) having, in use, received a "acknowledgement" type command;

commands data, optionally of an array data type, the commands data containing at least one specific command to one between the base station (1) or the underwater vehicle (2), optionally wherein said commands data cause, in use, a control or an imposition of a motion to a specific direction or coordinates set provided with the location data;

skipping data, optionally of an array data type, the skipping data allowing one between the base station (1) or the underwater vehicle (2) to skip a message wherein the skipping data is contained, commands report data, optionally of an array data type, the commands report data being configured to identify whether a previously sent command has been executed by one between the base station (1) or the underwater vehicle (2) and/or being configured to identify a result of a previous command sent by one between the base station (1) or the underwater vehicle (2);

sequence number data, optionally of a number data type, the sequence number data being configured to identify whether one between the base station (1) or the underwater vehicle (2) has received in use a plurality of commands data to identify a specific order of the command data.

According to a further non-limiting aspect, at least one between the base station (1) or the underwater vehicle (2) is configured to associate the position and/or orientation signal, in particular data contained in the position and/or orientation signal, to the location data.

According to a further non-limiting aspect, the status data comprises at least one of the data of the following list:

"doing mission" data, configured to indicate that one between the base station (1) or the underwater vehicle (2) is performing a specific imposed command or activity, "searching" data, configured to indicate that one between the base station (1) and the underwater vehicle (2) to which a command has already been sent, is performing a search according to at least one parameter, preferably a plurality of parameters;

"lost" data, configured to indicate that one between the base station (1) or the underwater vehicle (2) has lost his position and/or has failed to reach a specified destination specified with the location data;

"returning home" data, configured to indicate that one between the base station (1) or the underwater vehicle (2) is approaching the other between the base station (1) or the underwater vehicle (2);

"heading to mission" data, configured to indicate that one between the base station (1) or the underwater vehicle (2) is approaching a location specified by the location data;

"emergency" data, configured to indicate a malfunction of one between the base station (1) or the underwater vehicle (2) and/or an immediate suspension of any activity performed by one between the base station (1) or the underwater vehicle (2).

According to a further non-limiting aspect, the commands data comprise a plurality of portions; the plurality of portions comprising at least one between the portions of the following list: an action portion configured to identify a specific action that the one between the base station (1) or the underwater vehicle (2) shall perform; a parameter portion comprising data associated to said specific action, in particular metric data associated to the specific action; an adjective portion, comprising data associated to the data of the parameter portion; an object portion, containing data referring to a destination of a motion or of an action carried out by one of the base station (1) or the underwater vehicle (2).

According to a further non-limiting aspect, the at least a first hydrophone (11) and the at least a second hydrophone (21) have a respective axis of transmission and/or reception (X), and the at least a first optical communication device (12) and the at least a second optical communication device (22) have a respective axis of alignment, and the axis of transmission and/or reception (X) and the axis of alignment of the first hydrophone (11) and, respectively, of the first optical communication device (12) are parallel, and/or the axis of transmission and/or reception (X) and the axis of alignment of the second hydrophone (21) and, respectively, of the second optical communication device (22) are parallel.

According to a further non-limiting aspect, at least one first hydrophone (11) and one second hydrophone (11) of the first plurality of hydrophones (11), and at least one first hydrophone (21) and one second hydrophone (21) of the second plurality of hydrophones (21) have a respective axis of transmission and/or reception (X), and the at least a first optical communication device (12) and the at least a second optical communication device (22) have a respective axis of alignment, and the axis of transmission and/or reception (X) and the axis of alignment of the one first hydrophone (11) of the first plurality of hydrophones (11) and, respectively, of the first optical communication device (12) are parallel, and the axis of transmission and/or reception (X) and the axis of alignment of the one second hydrophone (11) of the first plurality of hydrophones (11) and, respectively, of the first optical communication device (12) are arranged on different directions, and/or the axis of transmission and/or reception (X) and the axis of alignment of the one first hydrophone (21) of the second plurality of hydrophones (21) and, respectively, of the second optical communication device (22) are parallel, and the axis of transmission and/or reception (X) and the axis of alignment of the one second hydrophone (21) of the second plurality of hydrophones (21) and, respectively, of the second optical communication device (22) are arranged on different directions.

According to a further non-limiting aspect, at least one between the base station (1) and the underwater vehicle (2) comprises an actuator configured for controlling and/or moving an axis of transmission and/or reception of the first optical communication device (12) and/or of the second optical communication device (22).

According to a further non-limiting aspect, at least one between the base station (1) and the underwater vehicle (2) comprises an encryption module configured to encrypt data according to a predetermined encryption algorithm, and is configured to transmit at least one between the at least one ultrasonic and/or acoustic signal (AS) and/or the at least one optical signal (OS) as an encrypted ultrasonic and/or acoustic signal (AS) and/or as an encrypted optical signal (OS).

According to a further aspect, at least one between the base station (1) and the underwater vehicle (2) is configured to select between at least a first or a second algorithm of data encryption, one between said first or second algorithm of data encryption becoming said predetermined encryption algorithm.

According to a further non-limiting aspect, the at least one base station (1) and the at least one underwater vehicle (2), or at least the first and the second base station (1) and/or at least the first and the second underwater vehicle (2), are configured to carry out, optionally automatically, an electronic encryption and decryption algorithm synchronization, the electronic encryption and decryption algorithm synchronization determining the decryption of any between the encrypted ultrasonic and/or acoustic signal (AS) and/or encrypted optical signal (OS) with a decryption algorithm corresponding to said predetermined encryption algorithm.

[Control Unit]

According to a further aspect, it is herewith disclosed a control unit, comprising:

a first communication line, configured to be operatively connected with at least a first hydrophone (11, 21), the control unit being configured to:

receive a first signal, in particular an electric signal, from the at least a first hydrophone (11, 21), wherein the first signal is a transduction signal of an ultrasonic and/or acoustic signal (AS) received with the at least a first hydrophone (11, 21), and/or to transmit a second signal, in particular an electric signal, to the at least a first hydrophone (11, 21), wherein the second signal is configured to cause a transmission of an ultrasonic and/or acoustic signal (AS) by the at least a first hydrophone (11, 21), a second communication line, configured to be operatively connected with at least an optical communication device (12, 22), the control unit being configured to:

receive a third signal, in particular an electric signal, from the at least an optical communication device (12, 22), wherein the third signal is a transduction signal of an optical signal (OS) received by the at least an optical communication device (12, 22), and/or to transmit a fourth signal, in particular an electric signal, to the at least an optical communication device (12, 22), wherein the fourth signal is configured to cause a transmission of an optical signal (OS) by the at least one optical communication device (12, 22).

According to a further non-limiting aspect, the control unit is configured to be installed on at least one between a base station (1) for an underwater vehicle (2), or on at least an underwater vehicle (2), optionally one between the base station (1) and the underwater vehicle (2) of the system according to one or more of the herein disclosed aspects.

According to a further non-limiting aspect, the control unit is configured to transmit the second signal to a specifically adapted hydrophone (11, 21) configured and/or adapted to transmit an ultrasonic and/or acoustic signal (AS) by means of an embedded vibrator (11*r*) and/or amplifier (11*a*).

According to a further non-limiting aspect, the control unit comprises a selector, configured for selecting an activation of the at least a first hydrophone (11, 21) and/or an activation of the at least an optical communication device (12, 22) in accordance to at least one predetermined criterion.

According to a further non-limiting aspect, said selector is configured to cause a simultaneous activation of the at least a first hydrophone (11, 21) and of the at least an optical communication device (12, 22) by simultaneously transmitting the second signal to said at least a first hydrophone (11, 21) and the fourth signal to the at least an optical communication device (12, 22).

According to a further non-limiting aspect, the second signal is configured to cause an emission of an ultrasonic and/or acoustic signal (AS) in the [20-150] kHz range, preferably in the [30-110] kHz range.

According to a further non-limiting aspect, the control unit is configured to cause the transmission of the ultrasonic and/or acoustic signal (AS) on a plurality of frequency-spaced transmission channels (Ch1, Ch2, Ch3), optionally simultaneously on the plurality of frequency-spaced transmission channels (Ch1, Ch2, Ch3).

According to a further non-limiting aspect, the control unit is configured to cause the transmission of the optical signal (OS) on a plurality of frequency-spaced transmission channels (Ch1, Ch2, Ch3), optionally simultaneously on the plurality of frequency-spaced transmission channels (Ch1, Ch2, Ch3).

According to a further non-limiting aspect, the control unit is configured to modulate the at least one ultrasonic and/or acoustic signal (AS) and/or the optical signal (OS) according to one of the following modulation schemes: FSK modulation, ASK modulation, PSK modulation.

According to a further non-limiting aspect, the FSK modulation comprises a first carrier frequency and a second carrier frequency, being separated by a predefined guard interval.

According to a further non-limiting aspect, the control unit is configured to cause the transmission of at least one between the ultrasonic and/or acoustic signal (AS) or the optical signal (OS) as a numeric signal.

According to a further non-limiting aspect, the control unit is configured to allow adapting the predefined guard interval and/or to allow adapting the first carrier frequency and/or the second carrier frequency.

According to a further non-limiting aspect, at least one between the first signal and/or the second signal is a numeric-type, in particular a binary-type and/or a packet-type, signal, optionally configured to be a keying-type modulated signal.

According to a further non-limiting aspect, the control unit is configured to transmit the second signal at predetermined time slots in accordance to a synchronization provided by the reception of the first signal.

According to a further non-limiting aspect, the control unit is configured to transmit the second signal in order to cause the transmission of the ultrasonic and/or acoustic signal (AS) on at least one data channel (Ch1, Ch2) of the plurality of frequency-spaced transmission channels (Ch1, Ch2, Ch3) and to receive the first signal associated to a synchronization channel (Ch3) of the plurality of transmission channel.

According to a further non-limiting aspect, at least part of said ultrasonic and/or acoustic signal (AS) is asynchronous.

According to a further non-limiting aspect, the control unit is configured to transmit at least part of said ultrasonic and/or acoustic signal (AS), preferably the ultrasonic and/or acoustic signal (AS) transceived on said at least one data channel (Ch1, Ch2) asynchronously or according to an asynchronous protocol and is configured to transmit a synchronizing ultrasonic and/or acoustic signal (AS) on the at least one synchronization channel (Ch3) of the plurality of frequency-spaced transmission channels (Ch1, Ch2, Ch3).

According to a further non-limiting aspect, the control unit is configured to perform a signal processing on at least the first signal, said processing mitigating the effect of the underwater noise on said first signal.

According to a further non-limiting aspect, the signal processing comprises at least one of the processing operations of the following list: a frequency-based noise mitigation processing, in particular a Fast Fourier Transform noise mitigation processing; a matrix factorization noise mitigation processing; an adaptive and/or predictive filtering for noise mitigation.

According to a further non-limiting aspect, the control unit is configured to perform a transmission of the second signal to a plurality of hydrophones (11, 21), in particular being configured to perform a simultaneous transmission of the second signal to a plurality of hydrophones (11, 21).

According to a further non-limiting aspect, at least the first signal and/or the second signal contains messages provided with a structure comprising at least one of the fields of the following list: a command type field, containing data relating to the type of command provided to, or received by, the one between the base station (1) or the underwater vehicle (2); a payload field, containing data associated to said type of command provided to, or received by, one between the base station (1) or the underwater vehicle (2); a message number identification field; a checksum field.

According to a further non-limiting aspect, the control unit comprises at least one interface, optionally at least one electronic interface, configured to be operatively connected with a position and/or direction sensing element, optionally at least a radiofrequency positioning sensor and/or a pitometer, and/or a magnetic and/or inertial compass; said interface being configured to receive a position and/or direction sensing signal, in particular an electric position and/or direction sensing signal.

According to a further non-limiting aspect, the control unit is configured to control a provision of electric energy to a first recharging connector (1*r*), optionally a wireless first recharging connector (1*r*), of a base station (1) for an underwater vehicle (2), wherein the provision of electric energy is destined to cause a recharging of a battery of said underwater vehicle (2) or is configured to control the flow of an electric energy to a battery of the underwater vehicle (2) through a second recharging connector (2*r*) of an underwater vehicle (2) and/or is configured to monitor the recharging status of the battery of said underwater vehicle (2) and to cause the transmission of a battery recharging control signal to said base station (1), optionally through said first signal.

According to a further aspect, it is herewith disclosed a control unit, comprising:

- a first communication line, configured to be operatively connected with at least a first hydrophone (11, 21), the control unit being configured to:
  - receive a first signal, in particular an electric signal, from the at least a first hydrophone (11, 21), wherein the first signal is a transduction signal of an ultrasonic and/or acoustic signal (AS) received with the at least a first hydrophone (11, 21), and/or to
  - transmit a second signal, in particular an electric signal, to the at least a first hydrophone (11, 21), wherein the second signal is configured to cause a transmission of an ultrasonic and/or acoustic signal (AS) by the at least a first hydrophone (11, 21),
- a second communication line, configured to be operatively connected with at least an optical communication device (12, 22), the control unit being configured to:
  - receive a third signal, in particular an electric signal, from the at least an optical communication device (12, 22), wherein the third signal is a transduction signal of the optical signal (OS) received by the at least an optical communication device (12, 22), and/or to
  - transmit a fourth signal, in particular an electric signal, to the at least an optical communication device (12, 22), wherein the fourth signal is configured to cause a transmission of an optical signal (OS) by the at least one optical communication device (12, 22).

wherein at least one among the first, the second, the third and the fourth signal, is a numeric signal, optionally a binary and/or a packet-type numeric signal, comprising a message having a structure comprising at least one of the fields of the following list: a command type field, containing data relating to the type of command provided to, or received by, one between the base station (1) or the underwater vehicle (2); a payload field, containing data associated to said type of command provided to, or received by, one between the base station (1) or the underwater vehicle (2); a message number identification field; a checksum field.

According to a further non-limiting aspect, the first communication line is a full-duplex communication line, in particular configured to receive the first signal and to transmit the second signal simultaneously and/or the second communication line is a full duplex communication line, in particular configured to receive the third signal and to transmit the fourth signal simultaneously.

According to a further aspect, it is herewith disclosed a control unit, comprising:

a first communication line, configured to be operatively connected with at least a first hydrophone (11, 21), the control unit being configured to:

receive a first signal, in particular an electric signal, from the at least a first hydrophone (11, 21), wherein the first signal is a transduction signal of a ultrasonic and/or acoustic signal (AS) received with the at least a first hydrophone (11, 21), and/or to transmit a second signal, in particular an electric signal, to the at least a first hydrophone (11, 21), wherein the second signal is configured to cause a transmission of an ultrasonic and/or acoustic signal (AS) by the at least a first hydrophone (11, 21), wherein at least one between the first and the second signal, is a numeric signal, optionally a binary and/or a packet-type numeric signal, comprising a message having a structure comprising at least one of the fields of the following list: a command type field, containing data relating to the type of command provided to, or received by, one between the base station (1) or the underwater vehicle (2); a payload field, containing data associated to said type of command provided to, or received by, one between the base station (1) or the underwater vehicle (2); a message number identification field; a checksum field.

According to a further non-limiting aspect, the control unit further comprises:

a second communication line, configured to be operatively connected with at least an optical communication device (12, 22), the control unit being configured to:

receive a third signal, in particular an electric signal, from the at least an optical communication device (12, 22), wherein the third signal is a transduction signal of an optical signal (OS) received by the at least an optical communication device (12, 22), and/or to transmit a fourth signal, in particular an electric signal, to the at least an optical communication device (12, 22), wherein the fourth signal is configured to cause a transmission of an optical signal (OS) by the at least one optical communication device (12, 22).

According to a further non-limiting aspect, at least one between the third and the fourth signal, is a numeric signal, optionally a binary and/or a packet-type numeric signal, comprising a message having a structure comprising at least one of the fields of the following list: a command type field, containing data relating to the type of command provided to, or received by, one between the base station (1) or the underwater vehicle (2); a payload field, containing data associated to said type of command provided to, or received by, one between the base station (1) or the underwater vehicle (2); a message number identification field; a checksum field.

According to a further non-limiting aspect, the control unit is configured to cause the activation of an actuator for controlling and/or moving an axis of transmission and/or reception of the first optical communication device (12) and/or of the second optical communication device (22).

According to a further non-limiting aspect, said control unit comprises an encryption module configured to encrypt data according to a predetermined encryption algorithm, and is configured to transmit at least one between the at least one ultrasonic and/or acoustic signal (AS) and/or the at least one optical signal (OS) as an encrypted ultrasonic and/or acoustic signal (AS) and/or as an encrypted optical signal (OS).

According to a further aspect, said control unit is configured to select between at least a first or a second algorithm of data encryption, one between said first or second algorithm of data encryption becoming said predetermined encryption algorithm.

According to a further non-limiting aspect, said control unit is configured to carry out, optionally automatically, an electronic encryption and decryption algorithm synchronization, the electronic encryption and decryption algorithm synchronization determining the decryption of any between the encrypted ultrasonic and/or acoustic signal (AS) and/or encrypted optical signal (OS) with a decryption algorithm corresponding to said predetermined encryption algorithm.

According to a further non-limiting aspect, said control unit is installed on a base station (1) and/or on an underwater vehicle (2) and is configured to carry out said electronic encryption and decryption algorithm synchronization with at least another control unit, optionally according to one or more of the herewith described aspects, installed on a base station (1) and/or on an underwater vehicle (2).

[Computer Program]

According to a further non-limiting aspect, it is herewith disclosed a computer program, stored on a memory support, and configured to be executed by a data processing unit; the computer program comprising software code portions configured to cause the execution of one or more of the steps of the method according to one or more of the aspects herein described.

In particular, according to a further aspect, it is herewith disclosed a computer program, stored on a memory support, and configured to be executed by a data processing unit; the computer program comprising software code portions configured to cause the execution of:

a step of transmission of at least one ultrasonic and/or acoustic signal (AS) by means of at least one first or second hydrophone (11, 21) respectively of a base station (1) for an underwater vehicle (2) and of an underwater vehicle (2), the first or second hydrophone (11, 21) being adapted and/or configured to allow a transmission and reception of ultrasonic and/or acoustic signals (AS), and/or a step of transmission of at least one optical signal (OS) by means of at least one first or second optical communication device (12, 22) respectively of the base station (1) and of the underwater vehicle (2).

According to a further non-limiting aspect, the computer program determines controlling the underwater vehicle (2) as a slave unit, controlled by the base station (1) as a master unit by means of the step of transmission of at least one ultrasonic and/or acoustic signal (AS) and/or by means of the step of transmission of at least one optical signal (OS).

According to a further non-limiting aspect, the computer program determines controlling the base station (1) as a slave unit, controlled by the first and the second underwater vehicles (1) as master units by means of the step of transmission of at least one ultrasonic and/or acoustic signal (AS) and/or by means of the step of transmission of at least one optical signal (OS).

According to a further non-limiting aspect, the step of transmission of at least one ultrasonic and/or acoustic signal (AS) by means of the at least one between the first hydrophone (11) and the second hydrophone (21), and/or the step of transmission of at least one optical signal (OS) by means of at least one between the first optical communication device (12) and the second optical communication device (22) determine the control of the first and second underwater vehicle (2) according to a single master-multi slave protocol of control, the base station (1) acting as a master unit controlling the first and the second underwater vehicle (2) as slave units.

According to a further non-limiting aspect, the step of transmission of at least one ultrasonic and/or acoustic signal (AS) by means of the at least one between the first hydrophone (11) and the second hydrophone (21), and/or the step of transmission of at least one optical signal (OS) by means of at least one between the first optical communication device (12) and the second optical communication device (22) determine the control of the first and second base station (1) according to a single master-multi slave protocol of control, the underwater vehicle (2) acting as a master unit controlling the first and the second base stations (1) as slave units.

According to a further non-limiting aspect, the step of transmission of at least one ultrasonic and/or acoustic signal (AS) and/or the step of transmission of at least one optical signal (OS) allow setting up a signal transceiving between the base station (1) and the underwater vehicle (2).

According to a further non-limiting aspect, the base station (1) and the underwater vehicle (2) are those of the system according to one more of the aspects here described.

According to a further aspect, it is herewith disclosed a computer program, stored on a memory support, and configured to be executed by a data processing unit; the computer program comprising software code portions that when executed cause the execution of:

- a step of transmission of at least one ultrasonic and/or acoustic signal (AS) by means of at least one first or second hydrophone (11, 21) respectively of a base station (1) for an underwater vehicle (2) and of an underwater vehicle (2), the first or second hydrophone (11, 21) being adapted and/or configured to allow a transmission and reception of ultrasonic and/or acoustic signals (AS), and/or
  - a step of transmission of at least one optical signal (OS) by means of at least one first or second optical communication device (12, 22) respectively of the base station (1) and of the underwater vehicle (2)
  - wherein the step of transmission of at least one between said ultrasonic and/or acoustic signal (AS) and said optical signal (OS) is a step of transmission of a numeric signal, optionally a binary and/or a packet-type numeric signal, comprising a message having a structure including at least one of the fields of the following list: a command type field, containing data relating to the type of command provided to, or received by, one between the base station (1) or the underwater vehicle (2); a payload field, containing data associated to said type of command provided to, or received by, one between the base station (1) or underwater vehicle (2); a message number identification field; a checksum field.

According to a further aspect, it is herewith disclosed a computer program, stored on a memory support, and configured to be executed by a data processing unit; the computer program comprising software code portions configured to cause the execution of at least a step of transmission of at least one ultrasonic and/or acoustic signal (AS) by means of at least one first or second hydrophone (11, 21) respectively of a base station (1) for an underwater vehicle (2) and of an underwater vehicle (2), the first and/or second hydrophone (11, 21) being adapted and/or configured to allow a transmission and reception of ultrasonic and/or acoustic signals (AS),

- wherein the step of transmission of said ultrasonic and/or acoustic signal (AS) is a step of transmission of a numeric signal, optionally a binary and/or a packet-type numeric signal, comprising a message having a structure including at least one of the fields of the following list: a command type field, containing data relating to the type of command provided to, or received by, one between the base station (1) or the underwater vehicle (2); a payload field, containing data associated to said type of command provided to, or received by, one between the base station (1) or underwater vehicle (2); a message number identification field; a checksum field.

According to a further non-limiting aspect, the computer program further comprises software code portions that once executed cause the execution of a step of transmission of at least one optical signal (OS) by means of at least one first or second optical communication device (12, 22) respectively of the base station (1) and of the underwater vehicle (2).

According to a further non-limiting aspect, the step of transmission of said optical signal (OS) is a step of transmission of a numeric signal, optionally a binary and/or a packet-type numeric signal, comprising a message having a structure including at least one of the fields of the following list: a command type field, containing data relating to the type of command provided to, or received by, one between the base station (1) or the underwater vehicle (2); a payload field, containing data associated to said type of command provided to, or received by, one between the base station (1) or underwater vehicle (2); a message number identification field; a checksum field.

According to a further non-limiting aspect, the software code portions cause the definition and/or the establishment of a plurality of frequency-spaced transmission channels (Ch1, Ch2, Ch3) of ultrasonic and/or acoustic signal transmission, and the step of transmission of at least one ultrasonic and/or acoustic signal (AS) takes place on said plurality of frequency-spaced transmission channels (Ch1, Ch2, Ch3), in particular taking place simultaneously on said plurality of frequency-spaced transmission channels (Ch1, Ch2, Ch3) optionally wherein the step of transmission of the at least one ultrasonic and/or acoustic signal (AS) takes place according to a FSK modulation, or an ASK modulation, or a PSK modulation.

According to a further non-limiting aspect, the software code portions cause the definition and/or the establishment of a plurality of frequency-spaced transmission channels (Ch1, Ch2, Ch3) of optical signal transmission, and the step of transmission of said optical signal (OS) takes place on said plurality of frequency-spaced transmission channels (Ch1, Ch2, Ch3), in particular taking place simultaneously on said plurality of frequency-spaced transmission channels (Ch1, Ch2, Ch3) optionally wherein the step of transmission of said optical signal (OS) takes place according to a FSK modulation, or an ASK modulation, or a PSK modulation.

According to a further non-limiting aspect, the at least one between the ultrasonic and/or acoustic signal (AS) and the optical signal (OS) comprises a plurality of 0s and 1s and the step of transmission of the at least one between the ultrasonic and/or acoustic signal (AS) and the optical signal (OS) according to the FSK modulation comprises modulating the 0s and the 1s respectively on a first and a second carrier frequency spaced one with respect to the other, said first and second carrier frequencies being spaced of a predefined guard interval.

According to a further non-limiting aspect, the step of transmission of the at least one between the ultrasonic and/or acoustic signal (AS) and the optical signal (OS) comprises transmitting a plurality of 0s and 1s.

According to a further non-limiting aspect, the method comprises using the first data channel (Ch1) for transmitting the 0s, and the second data channel (Ch2) for transmitting the 1s.

According to a further non-limiting aspect, the at least one optical signal (OS) comprises a plurality of 0s and 1s and the step of transmission of the optical signal (OS) according to the FSK modulation comprises modulating the 0s and the 1s respectively on a first and a second carrier frequency spaced one with respect to the other, said first and second carrier frequencies being spaced of a predefined guard interval.

According to a further non-limiting aspect, the software code portions cause the actuation of at least one actuator for controlling and/or moving an axis of transmission and/or reception of the first optical communication device (12) and/or of the second optical communication device (22).

According to a further non-limiting aspect, the computer program comprises software code portions that once executed determine performing a synchronization of the control and/or of the motion of the underwater vehicle (2) with respect to the base station (1),

- the synchronization taking place by means of the ultrasonic and/or acoustic signal (AS),
- the step of transmission of at least one ultrasonic and/or acoustic signal (AS) comprising transmitting control and/or motion data on at least one data channel (Ch1, Ch2) of the plurality of frequency-spaced transmission channels (Ch1, Ch2, Ch3) and/or comprising transmitting synchronization data on at least one synchronization channel (Ch3) of the plurality of frequency-spaced transmission channels (Ch1, Ch2, Ch3).

According to a further non-limiting aspect, the step of transmission of at least one ultrasonic and/or acoustic signal (AS) is a step of at least partially asynchronous transmission.

According to a further non-limiting aspect, the step of transmission of at least one ultrasonic and/or acoustic signal (AS) comprises transmitting asynchronously part of said ultrasonic and/or acoustic signal (AS) on one data channel (Ch1, Ch2) of the plurality of frequency-spaced transmission channels (Ch1, Ch2, Ch3) and comprises a transmission of a synchronizing ultrasonic and/or acoustic signal (AS) on at least one synchronization channel (Ch3) of the plurality of frequency-spaced transmission channels (Ch1, Ch2, Ch3).

According to a further non-limiting aspect, the computer program comprises software code portions that once executed cause a step of encryption of data according to a predetermined encryption algorithm, and the step of transmission of at least one ultrasonic and/or acoustic signal (AS) and/or the step of transmission of at least one optical signal (OS) is a step of transmission of an encrypted ultrasonic and/or acoustic signal (AS) and/or a step of transmission of an encrypted optical signal (OS).

According to a further aspect, the computer program comprises software code portions that once executed cause a selection between at least a first or a second algorithm of data encryption, one between said first or second algorithm of data encryption becoming said predetermined encryption algorithm.

According to a further non-limiting aspect, the computer program comprises software code portions that once executed cause a step of encryption and decryption algorithm synchronization, taking place between at least one base station (1) and at least one underwater vehicle (2) or between at least two base stations (1) or between two underwater vehicles (2); the step of encryption and decryption algorithm synchronization determining the decryption of any between the encrypted ultrasonic and/or acoustic signal (AS) and/or encrypted optical signal (OS) with a decryption algorithm corresponding to said predetermined encryption algorithm.

FIGURES

The detailed description discloses a preferred embodiment and several alternative embodiments of the method and system according to the present disclosure will be presented. The detailed description refers to the annexed figures. The present paragraph discloses a brief description of the figures.

FIG. 1 shows a schematic view of a base station and of an underwater vehicle according to the present disclosure, wherein an ultrasonic and/or acoustic signal and an optical signal are transmitted between the base station and the underwater vehicle for the purpose of controlling the underwater vehicle.

FIG. 2 shows a more detailed schematic view of a communication subsystem for the base station and the underwater vehicle of the present disclosure.

FIG. 6 shows a particular, non-limiting, spatial configuration for a plurality of hydrophones connected to a filtering unit configured to mitigate underwater noise in the received ultrasonic and/or acoustic signal.

FIG. 7 shows a particular schematic view for a message exchanged between the base station and the underwater vehicle.

FIG. 8 shows a schematic diagram of operating hardware and/or software units in the system of the present disclosure.

DETAILED DESCRIPTION

Figure 3:
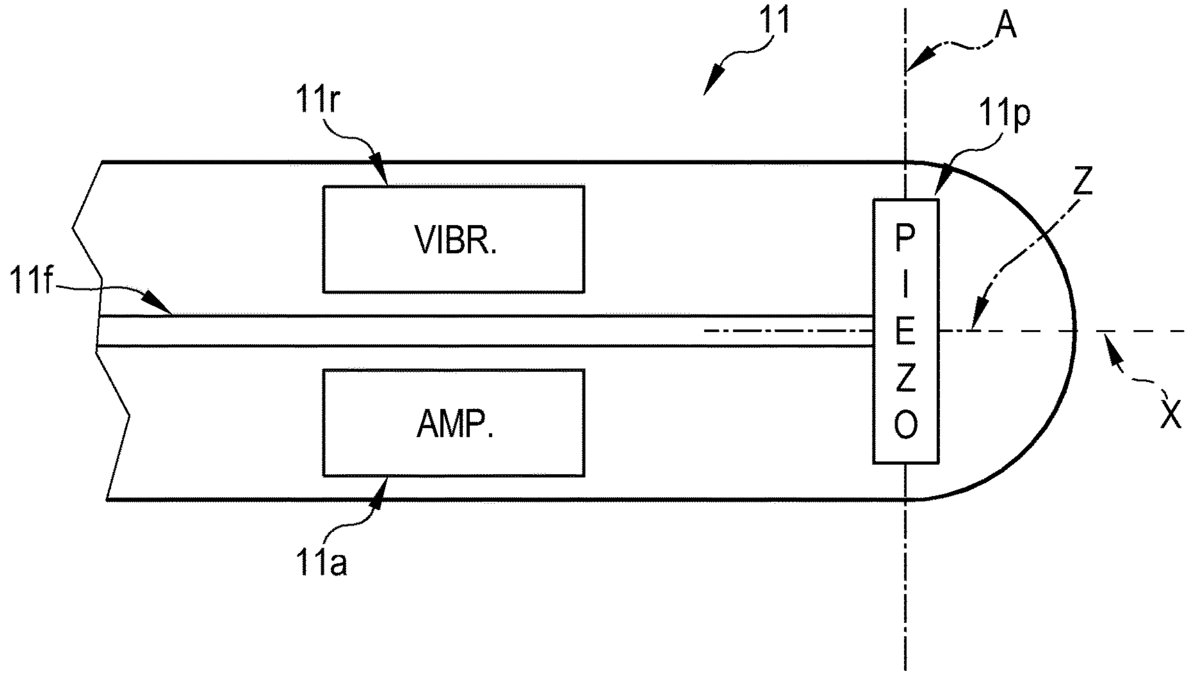
FIG. 3 shows a schematic view of a modified hydrophone, configured to allow the transmission and reception of ultrasonic and/or acoustic signals.

FIG. 1 shows a schematic view of a base station and of an underwater vehicle according to the present disclosure; the base station 1 lies in substantial correspondence of a sea bed while the underwater vehicle 2 is positioned at a distance from the base station 1. The base station 1 and the underwater vehicle 2 are operatively connected or coupled one with the other by means of a wireless communication, in particular by means of a fully wireless communication that will be disclosed in detail in the following portion of description. With the term "operatively connected or coupled" it is meant a connection or coupling allowing a signal and/or data exchange for a control or report of operations, included the transmission of power signals, in particular electric signals or electromagnetic signals, allowing the recharging of one or more batteries.

For the purposes of the present disclosure, the assembly formed by the base station 1 and the underwater vehicle 2 realizes an underwater system. Albeit the detailed description will refer to an underwater system comprising a single base station 1 and a single underwater vehicle 2, it shall not be intended that a single base station and a single underwater vehicle may be present in a limiting way; in fact, the system could also be provided with a plurality of underwater vehicles 2 and/or with a plurality of base stations 1.

The wording "underwater vehicle" encompasses devices being capable of moving underwater; those devices may have several configurations, shapes, operative depths, purposes; in a preferred, non-limiting, embodiment, the underwater vehicle 2 is an unmanned vehicle.

In an embodiment, which shall not be considered limiting, the base station 1 is a docking station for the underwater vehicle 2; in particular, such base station 1 may be configured to be self-standing, or to be connected to a controlling marine vessel, or even to be a station configured to be arranged in substantial correspondence of the seabed. In an embodiment, the controlling connection with the marine vessel is a cabled controlling connection; alternatively such controlling connection may be wireless or at least partially wireless.

In an embodiment, the base station 1 may be designed in such a way that a body thereof is configured to house at least partially the underwater vehicle into a cavity substantially defined in the overall profile defined by the body. In a further embodiment, the body of the base station may be reconfigurable.

Albeit this shall not be considered limiting, in an embodiment the base station 1 is an underwater docking station for communication with one or more underwater vehicles comprising:

- a support structure;
- an optical communication module, in particular albeit in a non-limiting extent configured for communication with said one or more underwater devices along an optical communication axis;
- a coupling arrangement mounting the optical communication module to the support structure;
- an actuator active on the optical communication module to move the optical communication axis between at least one first operative position and one second operative position, wherein, in the first operative position, the communication axis is directed along a first communication direction and, in the second operative position, the communication axis is directed along a second communication direction different from the first communication direction;
- a control unit connected to:
  - the optical communication module to manage a communication with said one or more underwater devices, and
  - the actuator to drive the optical communication axis to the first operative position and to the second operative position.

In another embodiment, which is non-limiting, the base station 1 is an underwater docking station for communication with one or more underwater devices comprising:

- a support structure comprising:
  - a base portion,
  - a top portion,
  - a mechanism interposed between the base portion and the top portion to allow moving the base portion away from the top portion defining an housing space for receiving the underwater device between the base portion and the top portion and to allow reducing or removing the housing space defining a compact configuration of the underwater docking station, and
  - a reversible actuator active on the mechanism to increase or reduce the housing space by approaching or distancing the base portion and the top portion;
- a communication module including either or both an optical communication module configured for communication with said one or more underwater devices along an optical communication axis and/or an acoustic module for communication with said one or more underwater devices;
- a coupling arrangement mounting the communication module to the support structure;
- a control unit connected to:
  - the communication module to manage a communication with said one or more underwater devices, and
  - the reversible actuator to drive the mechanism for approaching or distancing the base portion and the top portion.

The base station 1 comprises at least a first hydrophone 11, adapted and/or configured for transmitting and receiving ultrasonic and/or acoustic signals AS, and at least a first optical communication device 12, comprising an optical transmitter and/or an optical receiver.

The underwater vehicle 2, configured to be operatively coupled with the base station 1, comprises at least a second hydrophone 21, adapted and/or configured for transmitting and receiving ultrasonic and/or acoustic signals AS, and at least a second optical communication device 22, comprising an optical transmitter and/or an optical receiver.

The first and second hydrophones 11, 21 and the first and second optical communication device 12, 22 may be configured to operate, or at least to survive, at the maximal operative (respectively, survival) depth at which the base station 1 and/or the underwater vehicle 2 operate.

As schematically shown in FIG. 3, a typical hydrophone 11 comprises at least one piezoelectric transducer 11*p* that acts as an underwater microphone designed for detecting underwater waves belonging to the field (frequency) of the ultrasounds and/or of the acoustic signals. The piezoelectric transducer 11*p* generates an electric potential when subjected to a pressure change, such as a sound wave. The electric potential is processed by means of a data processing unit connected to the piezoelectric transducer 11*p* by means of a wiring 11*f*. A non-limiting example of a piezoelectric sonar producer is Aquarian Audio.

The adaptation and/or configuration of the first hydrophone 11 and/or of the second hydrophone 21 may comprise the inclusion of at least one between a vibrator 11*r* and/or of an amplifier 11*a*, specifically configured and designed to allow an efficient transmission of ultrasonic and/or acoustic signals AS, in particular an high-power transmission of ultrasonic and/or acoustic signals AS. Preferably, the vibrator 11*r* and/or the amplifier 11*a* is fed by means of the same wiring 11*f* that is used by the piezoelectric transducer 11*p*.

It is further noted that in principle, also the piezoelectric transducer 11*p* could be used for transmitting an underwater and/or acoustic signal AS, but preferably the transmission of the underwater and/or acoustic signal AS takes place with the vibrator 11*r* and/or with the amplifier 11*a*; this helps achieving more transmission power without risking a damage to the piezoelectric transducer 11*p*.

Albeit this shall not be considered limiting, in an embodiment the body of the hydrophone is substantially elongated, and defines a main direction of extension that defines substantially a pointing direction or axis of the hydrophone. Such axis will be further referred in the present description as the axis of reception and/or transmission X.

It is in particular noted that a preferred and non-limiting embodiment of the first hydrophone 11, and/or of the second hydrophone 21, is specifically configured to operate in a full-duplex communication environment, i.e. wherein a simultaneous reception and transmission takes place. A hydrophone provided with such vibrator 11*r* and/or with the amplifier 11*a* is considered suitable to operate in a full-duplex communication. This implies that in an embodiment at least one between the base station 1 and the underwater vehicle 2 is configured to operate a full duplex (that is, simultaneous) transceiving of ultrasonic and/or acoustic signals AS.

At least one between the first optical communication device 12 and the second optical communication device 22 is configured to transmit at least one optical signal OS and at least one between the first optical communication device 12 and the second optical communication device 22 is configured to receive said optical signal OS.

As shown more in detail in FIG. 2, in a preferred, non-limiting embodiment, the first optical communication device 12 comprises a camera 12*a* and an optical radiator 12*b*; the second optical communication device 12 comprises a camera 22*a* and an optical radiator 22*b*. Cameras are configured to receive an optical signal OS, while optical radiators are configured to transmit the optical signal OS. In another embodiment, not shown in the annexed figures, at least one between base station 1 and the underwater vehicle 2 may comprise only one between such camera or optical radiator. This means that in at least one embodiment, at least one between the base station 1 and the underwater vehicle 2 is a passive, optically receiving, device; in contrast, when both the base station 1 and the underwater vehicle 2 are provided with a camera and with an optical radiator, both those devices are capable of transceiving optical signals OS, and thus—when considered in their complex—are configured to establish and keep at least temporarily a bi-directional transmission and/or reception of optical signals OS.

It is noted that an actuator to move the optical communication axis may be also present on the underwater vehicle 2. Preferably, albeit in a non-limiting extent, the actuator may be controlled by a data processing unit of the underwater vehicle; in particular an algorithm of control may be implemented to follow (tracking), when possible, a predetermined source of underwater optical communication.

For the purposes of the present disclosure, with "ultrasonic signal" shall be intended a signal whose frequency is higher than 20 kHz, preferably comprised in the interval [20-200] kHz, more preferably in the interval [20-100] kHz. For the purposes of increasing the efficiency of the system herewith disclosed it is preferably to choose a transmission and/or reception of ultrasonic signals in the higher portions of the aforementioned ranges.

For the purposes of the present disclosure, with "acoustic signal" shall be intended a signal whose frequency is equal or lower than 20 kHz, preferably comprised in the interval [0.01-20] kHz, more preferably in the interval [0.02-20] kHz.

It is noted that the ultrasonic and/or acoustic signal AS is so defined since in an embodiment its bandwidth may be located between the frequency range of the ultrasonic signals and the frequency range of the acoustic signals, or the plurality of carriers of the channels of the signal may be located between the frequency range of the ultrasonic signals and the frequency range of the acoustic signals.

Albeit this shall not be considered limiting, the hydrophones herein described have a substantially flat (or linear) frequency response at least for the transmission and/or reception of ultrasonic signals and/or for the transmission and/or reception of acoustic signals. This will increase the quality of communication between the base station 1 and the underwater vehicle 2.

For the purposes of the present disclosure, with "optical signal" shall be intended a signal within the range of visible light—about in the [380-750] nm range—and/or in the range of the infrared light—about in the [700-1000] nm range—and/or in the range of the ultraviolet light—about in the range [10-380] nm range. The clause "and/or" is provided since in an embodiment the bandwidth of the optical signal OS may be so broad to cover at least two or three among the ranges of the visible light, the infrared light, the ultraviolet light.

The combination of an optical communication and of a ultrasonic and/or acoustic communication between the base station 1 and the underwater vehicle 2 allows to exchange high-bandwidth data using the optical signal OS and to obtain long communication distances, even if at a lower bandwidth, using the ultrasonic and/or acoustic signal AS, in particular without requesting complex and/or delicate transmitters differing from a differently configured or adapted hydrophone.

For the purpose of the present disclosure, the ultrasonic and/or acoustic communication and the optical communication constitute two distinct logic channels for allowing a communication between the base station 1 and underwater vehicle 2. The fact that the operative connection of the base station 1 with the underwater vehicle 2 takes place through two logic channels of communication operating at frequencies significantly different each other allows to guarantee that some noise sources that may affect one logic channel do not interfere with the other logic channel; in some embodiments those two logic channels may be used simultaneously for redundancy—especially for redundancy of control—thereby achieving an increase of reliability of communication.

Figure 5:
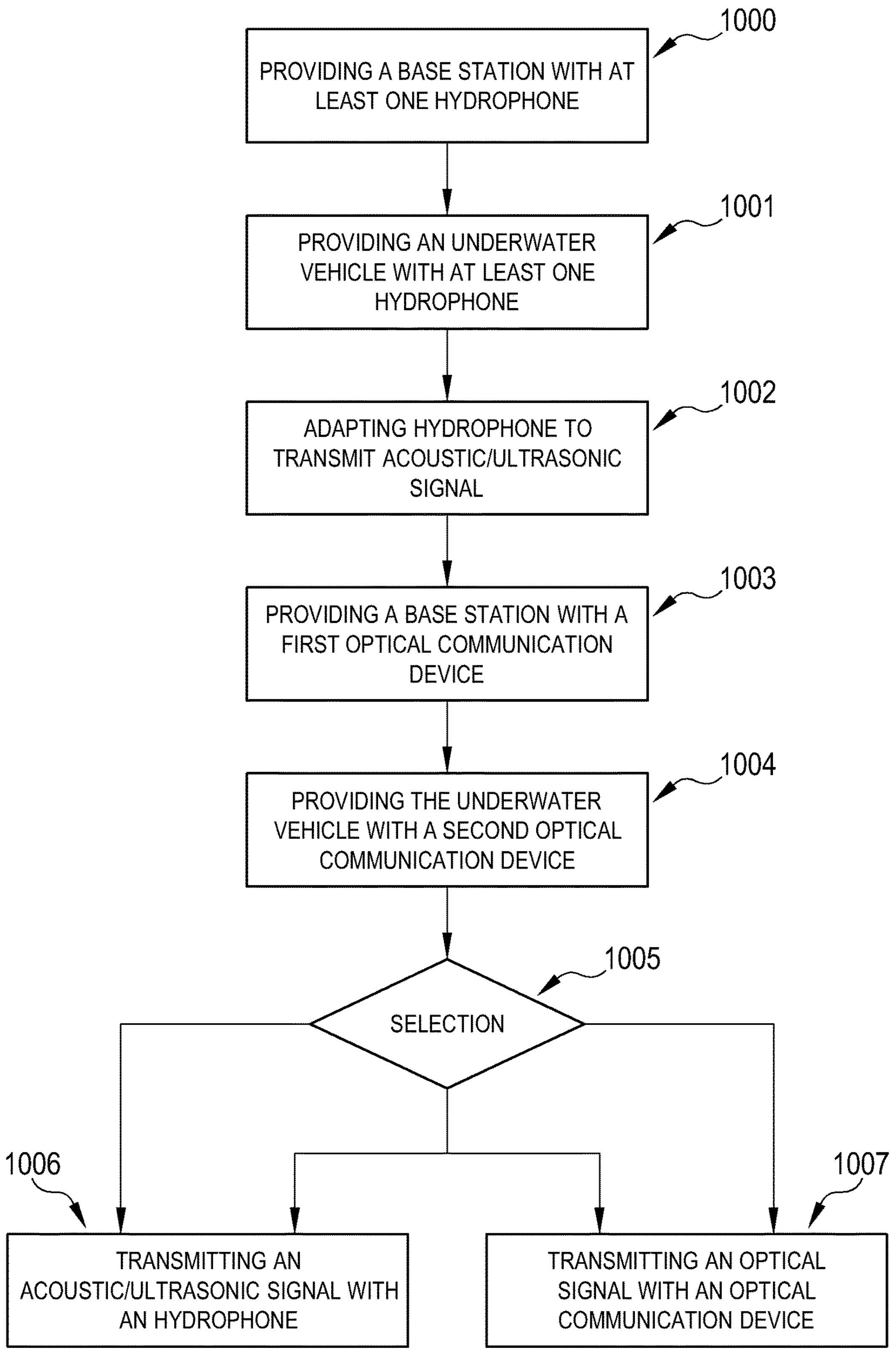
FIG. 5 shows a flow diagram of a communication method for allowing operative connection and control between the base station and the underwater vehicle.

It is thus clear that the present disclosure further relates to a wireless communication method that is schematically shown in FIG. 5.

Reference number 1000 identifies a step of providing the base station 1 with at least a first hydrophone 11. The provision may be carried out as a retrofitting for an already existing and/or operating base station 1, or—in contrast—on a new base station 1, specifically adapted for the purposes of the present application. Reference number 1001 identifies a step of providing an underwater vehicle with at least a second hydrophone 21. Even in this case, the provision may be carried out as a retrofitting or on a newly conceived base station 1.

Reference number 1002 identifies a step of adapting and/or configuring the first hydrophone and the second hydrophone in order to allow a transmission and reception of ultrasonic and/or acoustic signals AS. In an embodiment, the step of adaptation and/or configuration takes place by means of adding at least one between a vibrator 11*r* and an amplifier 11*a*, which are configured to allow the transmission of an ultrasonic and/or acoustic signal AS in an effective way.

Reference number 1003 identifies a step of providing the base station 1 with a first optical communication device 12 that may comprise at least one between the aforementioned camera and/or optical radiator. Reference number 1004 identifies a step of providing the underwater vehicle 2 with a second optical communication device 22 that may comprise at least one between the aforementioned camera and/or optical radiator. Preferably, albeit in a non-limiting extent the provision may be such that the camera and the optical radiator, when both present on a single device, are installed in such a way to have a common direction of sensing and emission. This is preferable since the optical communication, especially underwater, takes place with a substantially narrow cone of directivity.

It is noted that in the embodiment shown in FIG. 1 the base station 1 comprises a first couple of hydrophones 11 and the underwater vehicle 2 comprises a second couple of hydrophones 21. This configuration allows for increasing the effectiveness of the operative communication established in use between the base station 1 and the underwater vehicle 2, and may lead to an increase of the maximal communication distance between the base station 1 and the underwater vehicle 2 with respect to a configuration wherein only a single hydrophone is installed on the base station 1 and on the underwater vehicle 2 and/or, given a same distance between the base station 1 and the underwater vehicle 2, the configuration with two hydrophones per device may allow to reduce the impact of underwater noise in the operative communication.

The underwater vehicle 2 comprises at least one motor 2*m*, in particular at least one electric motor, configured to allow the motion of the underwater vehicle 2 in water. The motor 2*m* is connected to a propeller or to any equivalent means suitable to allow the propulsion of the underwater vehicle in water.

In a preferred embodiment, at least two—or more—motors are arranged on the underwater vehicle 2. In an embodiment, at least two motors are arranged on each between the left and the right side of the underwater vehicle 2. When a plurality of motors 2*m* is installed on the underwater vehicle 2, such motors are independently controlled. A downwardly oriented arrow in substantial correspondence of the motor 2*m* is depicted in FIG. 2; the arrow indicates schematically that such motor may have a power sufficient to lift the underwater vehicle 2 from the seabed.

The underwater vehicle 2 further comprises at least one battery, configured to store electric energy suitable to allow the feeding of the electric motor and/or to control the data processing unit(s) that is/are installed on the underwater vehicle 2 and that control the motion of underwater vehicle 2 and any further operation thereof.

In order to allow precisely defining the position of the underwater vehicle 2, at least one of the following position and/or direction sensing elements may be provided to the underwater vehicle: a radiofrequency positioning sensor, in particular a global positioning satellite system positioning sensor; a pitometer; a magnetic and/or inertial compass. The above-referred position may be an absolute position with respect to a fixed earth coordinate system or may be a relative position, in particular a position assumed by the underwater vehicle 2 with respect to the base station 1 or to any movable reference point. The same position and/or direction sensing elements may be provided on the base station 1. Clearly the movable reference point in consideration will be the point corresponding to the position of the base station 1 when dealing with the relative position assumed by the underwater vehicle 2, and will be the point corresponding to the position assumed by the underwater vehicle 2 when dealing with the relative position assumed by the base station 1.

The base station 1 comprises a first recharging connector 1*r* suitable to engage a second recharging connector 2*r* of the underwater vehicle 2, in such a way to allow the recharge of its battery. In an embodiment, the first recharging connector 1*r* and the second recharging connector 2*r* are configured to allow a wireless transfer of electric energy to the battery, and thus operate by means of an electromagnetic coupling.

It is noted that in a further embodiment, the underwater vehicle 2 may further comprise also different types of motors, e.g. endothermic and/or chemical motors, which may be used to provide electric energy for controlling the motion of underwater vehicle 2 and any further operation thereof.

It is further noted that FIG. 1 schematically shows an underwater vehicle 2 being provided with a recharging connector arranged at a top portion; this specific position shall not be considered limiting.

The system may be configured to exploit the operative connection provided by means of the ultrasonic and/or acoustic signal AS, and/or by the optical signal OS to manage, in particular to control, an approach and/or a positioning of the underwater vehicle 2 relative to the base station 1.

The system of the present disclosure comprises an hardware and/or software selector configured for selecting an activation of at least one between the first optical communication device 12 and the second optical communication device 22, and/or configured for selecting an activation of at least one between the first hydrophone 11 and the second hydrophone 21 or, when present, for selecting an activation of the first plurality of hydrophones 11 and the second plurality of hydrophones 21. The purpose of the selector is to allow a flexible management of the data transfer that is performed in use between the base station 1 and the underwater vehicle 2. Advantageously, the selector may be used to switch off at least one between the first hydrophone 11 and the second hydrophone 21 or, when present, the first plurality of hydrophones 11 and the second plurality of hydrophones 21, and the first optical communication device 12 and the second optical communication device 22.

The selector may be configured to select said activation in accordance to at least one predetermined criterion comprising available and/or required bandwidth for transmitting the ultrasonic and/or acoustic signal AS and/or the optical signal OS.

Indeed, the selector may be used to activate, in particular simultaneously, at least one between the first hydrophone 11 and the second hydrophone 21 or, when present, the first plurality of hydrophones 11 and the second plurality of hydrophones 21, and the first optical communication device 12 and the second optical communication device 22, when both low bandwidth and high bandwidth data transfer is required. In this sense it is noted that reference numbers 1006 and 1007 respectively identify a step of transmission of at least one ultrasonic and/or acoustic signal AS by means of at least one between the first hydrophone 11 and the second hydrophone 21 and a step of transmission of at least one optical signal OS by means of at least one between the first optical communication device 12 and the second optical communication device 22. These two steps can be performed in alternative or in a combined way by means of a step of selecting an activation of the at least one between the first hydrophone 11 and the second hydrophone 21 and/or an activation of the at least one between the first optical communication device 12 and the second optical communication device 22, wherein the selecting taking place in accordance to at least one predetermined criterion; the selector is schematically represented by block 1005, and the alternative or combined selection is represented by the three lines exiting from the block.

The selector may be configured to identify a type of data to be transmitted from the base station 1 to the underwater vehicle 2 or vice-versa, and to select at least one between the first hydrophone 11 and the second hydrophone 21 or, when present, the first plurality of hydrophones 11 and the second plurality of hydrophones 21, and the first optical communication device 12 and the second optical communication device 22 to transmit such data in an ultrasonic and/or acoustic signal AS and/or in an optical signal OS. More specifically, the selector is preferably configured to identify whether control and/or report command data or video and/or imaging and/or audio streaming data shall be transmitted and:

- if control and/or report command data shall be transmitted, the selector causes the activation of at least one between the first hydrophone 11 and the second hydrophone 21 and/or the activation of at least one between the first optical communication device 12 and the second optical communication device 22;
- if video and/or imaging and/or audio streaming data shall be transmitted, said selector causes the activation of at least one between the first optical communication device 12 and the second optical communication device 22.

It may be noted that audio streaming data may be provided also by the hydrophones; it is thus clear that it shall not be intended that the hydrophones herein described and their operative connection and/configuration are limited to control and/or report command data.

Streaming data requires a large bandwidth, which is guaranteed by the optical signal OS transmission, while control requires lower bandwidth; in this latter case the ultrasonic and/or acoustic signal AS may be sufficient. While exploiting optical signals OS in the context of the present disclosure may guarantee bandwidths up to several Mbps, in the framework of the present disclosure the transmission of ultrasonic and/or acoustic signals may allow to transmit data at up to 4 kbps or up to 3 kbps, or up to 4 kbps and in any case up to at least 500 kbps. The overall bandwidth that can be achieved by means of a transmission with the ultrasonic and/or acoustic signal AS may be increased adopting a transmission, in particular a simultaneous transmission, over a plurality of channels.

In an embodiment, the data types may at least comprise control data and streaming data and/or audio or image data. The control data is data embedding information specifically destined to allow the control of the base station 1 and/or the underwater vehicle 2; the streaming and/or audio or image data is data embedding information captured by a sensing element. In an embodiment, the sensing element may be at least one between a microphone and a camera, in particular a photo camera or a video camera, provided on the base station 1 or on the underwater vehicle 2.

Separating streaming requirements and control requirements in such a way that control data are transmitted with ultrasonic and/or acoustic signals AS while streaming data are transmitted with the optical signal OS allows to separate the bandwidth for such requirements, without reciprocal affection and, at least when the distance between the base station 1 and the underwater vehicle 2 is sufficient to support proper reception of both the optical signal OS and the ultrasonic and/or acoustic signal AS, allows for providing a backup in case of failure of any between the hydrophones or the optical communication devices.

In an embodiment, the selector may be provided only on the base station 1. In such embodiment the base station 1 may become a master controlling unit, and the underwater vehicle 2 will result as a slave unit. In another embodiment, the selector may be provided on the base station 1 and on the underwater vehicle 2; in this latter case, both the base station 1 and the underwater vehicle 2 may have the chance to actively control on which logic channel transmit the aforementioned data. In a further embodiment, the selector may be only provided on the underwater vehicle 2. In this latter case, the underwater vehicle 2 becomes a master controlling unit while the base station 1 will become a slave unit. It is thus clear that the present disclosure relates to a wireless communication method comprising identifying one between the base station 1 and the underwater vehicle 2 as a master device and identifying the other, between the base station 1 and the underwater vehicle 2, as a slave device. The slave device may be configured to receive commands and controls by the master device and to respond to commands and controls imposed by the master device by means of a response, in particular an automatic response, provided to the master device; in contrast, the slave device cannot provide commands and controls to the master device.

In this sense, it is noted that the protocol of communication conceived by the Applicant may be such that the base station 1 may control several underwater vehicles 2. In the embodiment wherein the selector is provided on the underwater vehicle 2, said underwater vehicle 2 may control several base stations 1. Such control may be a simultaneous control, wherein the base station 1 simultaneously controls several underwater vehicles 2 or wherein the underwater vehicle 2 simultaneously controls several base stations 1. Thus, the overall assembly realized by the base station 1 and at least one underwater vehicle 2 may thus operate with a single master-multi slave (SMMS) communication protocol.

The control of several underwater vehicles 2 or the control of several base stations 1 may take place by means of a switching between the ultrasonic and/or acoustic signal AS and the optical signal OS should the case may be and if the physical possibilities of signal propagation so allow. This may imply that, e.g., a first underwater vehicle 2 (or, alternatively, the first base station 1) may be controlled by means of an ultrasonic and/or acoustic signal AS while a second underwater vehicle 2 (or alternatively, the second base station 1) may be controlled by means of the optical signal OS.

In alternative or in combination with the aforementioned criteria of selection, the selector may be configured to select the activation of at least one between the first hydrophone 11 and the second hydrophone 21 or, when present, the first plurality of hydrophones 11 and the second plurality of hydrophones 21, and the first optical communication device 12 and the second optical communication device 22 in accordance to a criterion of distance between the base station 1 and the underwater vehicle 2, and/or of respective position between the base station 1 and the underwater vehicle 2.

In fact, while in the typical environment of the marine and/or salty water optical communications may be effectively performed up to distances of about 100 m, in particular of about 80 m, and more commonly up to distances of about 60 m, ultrasonic and/or acoustic communications may be performed—at least with the transmission powers typical of unmanned underwater vehicles—up to distances of about 500 m, in particular of about 300 m, and more commonly up to distances of about 200 m. Thus, the selector may be configured to perform a selection of the ultrasonic and/or acoustic signal AS transmission and/or of the optical signal OS transmission in accordance to the relative distance between the base station 1 and the underwater vehicle 2.

In a non-limiting embodiment, being the first threshold Th1 the maximum reachable distance with the ultrasonic and/or acoustic signal AS, and being the second threshold Th2 the maximum reachable distance with the optical signal OS, and being D the distance between the base station 1 and the underwater vehicle 2:

- if D>Th2 and D<Th1, the selector may be configured or programmed for selecting the first hydrophone 11 and the second hydrophone 21 or, when present, the first plurality of hydrophones 11 and the second plurality of hydrophones 21 to perform the data transmission, since with the first optical communication device 12 and the second optical communication device 22 the optical signal OS transmission would be too much affected;
- if D<Th2 and D<Th1, the selector has a free choice of, and thus may be configured or programmed for, selecting which among the first hydrophone 11 and the second hydrophone 21 or, when present, the first plurality of hydrophones 11 and the second plurality of hydrophones 21, and the first optical communication device 12 and the second optical communication device 22; in particular in this case the selector may be configured to perform a selection according to a further criterion;
- if D>Th2 and D>Th1, the selector has a free choice of, and thus may be configured or programmed for, either interrupting the transmission of the optical signal OS and of the ultrasonic and/or acoustic signal AS, or to keep the transmission of both the optical signal OS and of the ultrasonic and/or acoustic signal AS in order to increase the chances of allowing a proper correct reception of the data at the recipient, even if the distance between the base station 1 and the underwater vehicle 2 is relevant.

It may thus be inferred that given a first distance D1 and a second distance D2 between the base station 1 and the underwater vehicle 2, the first distance D1 being greater than the second distance D2, the transmission of at least one ultrasonic and/or acoustic signal AS takes place when the base station 1 and the underwater vehicle 2 are at the first distance D1 and the transmission of at least one optical signal OS takes place when the base station 1 and the underwater vehicle 2 are at the second distance D2. The second distance D2 is preferably lower than 100 m, preferably lower than 80 m, preferably lower than 60 m, and the first distance D1 is preferably lower than 500 m, preferably lower than 300 m, preferably lower than 200 m.

It is noted that the wording "relative position" has been used in the previous portion of description. Such relative position may be an angle assumed by a predetermined portion, e.g. a front portion, of the underwater vehicle 2 with respect to a predetermined portion, e.g. a front portion, of the base station 1.

According to the specific configuration of the first hydrophone 11 and the second hydrophone 21 or, when present, of the first plurality of hydrophones 11 and the second plurality of hydrophones 21, and of the first optical communication device 12 and the second optical communication device 22, in particular in accordance to the specific position in which they are mounted respectively on the base station 1 and on the underwater vehicle 2, the selector may be configured or programmed for performing the aforementioned selection.

In fact, typically, the first optical communication device 12 and/or the second optical communication device 22 are configured to perform the transmission of the optical signal OS along a preferential range of directions, in particular along a predetermined cone of radiation. In other words, the optical communication performed by the first optical communication device 12 and the second optical communication device 22 is substantially directive.

In contrast, hydrophones may be configured for allowing reception and/or transmission of ultrasonic and/or acoustic signals AS substantially along a wide angle of directions, in particular along an azimuthal plane A of the hydrophone. In an embodiment, on the zenithal plane Z of the hydrophone, the sensitivity curve of the hydrophone may variate: a maximum of sensitivity may be, for instance, across a 180° arch centered on an axis of reception and/or transmission X of the hydrophone, and will decrease beyond the limits of the aforementioned arch.

In other words, the ultrasonic and/or acoustic communication performed by the first hydrophone 11 and the second hydrophone 21 or, when present, by the first plurality of hydrophones 11 and the second plurality of hydrophones 21 is substantially non-directive.

This means that in use an effective communication using the optical signal OS may be performed only when the first optical communication device 12 and the second optical communication device 22 are substantially aligned, while an effective communication using the ultrasonic and/or acoustic signal AS may be performed also when the first hydrophone 11 and the second hydrophone 21 or, when present, the first plurality of hydrophones 11 and the second plurality of hydrophones 21 are not aligned.

In an embodiment wherein the base station 1 has a plurality of hydrophones 11 and/or wherein the underwater vehicle 2 has a plurality of hydrophones 21, at least one between base station 1 and the underwater vehicle 2 is provided with hydrophones arranged at different angles of alignment. This will help to identify, and then receive, ultrasonic and/or acoustic signals AS that may come from different sources and will help to discriminate multipath sources of ultrasonic and/or acoustic signals AS.

In detail, since the reception window of the hydrophones is never fully isotropic, arranging a plurality of hydrophones at different angles allows to differentiate the preferred direction of reception of the ultrasonic and/or acoustic signal AS. As well, it is even sufficient to differentiate the position of one hydrophone with respect to the other to allow mitigating the common effect that the noise may cause on the reception of the ultrasonic and/or acoustic signal AS.

In an embodiment, one hydrophone and the optical communication device are aligned in such a way to receive signals (respectively, ultrasonic and/or acoustic signals AS and optical signals OS) along a common direction; this means that their axis of reception and/or transmission are parallel. Preferably, this configuration is present on both the base station 1, thus for the first hydrophone 11 and the first optical communication device 12, and the underwater vehicle 2, thus for the second hydrophone 21 and the second optical communication device 22. When a plurality of hydrophones is present on either the base station 1 or the underwater vehicle 2, at least one between the first (or second) plurality of hydrophones has an axis of reception and/or transmission X which is parallel to the alignment axis of the first (or second) optical communication device.

A mitigation of such common effect may be such that at least one of two concerned hydrophones may be affected more by a noise signal that, by means of a hardware or software subtraction may thus be isolated effectively with respect to the signal that actually is intended to be received.

This allows mitigating the effect of the noise that may be present in the water in the range of ultrasonic and/or acoustic frequencies. In other words, the present disclosure refers to a method of mitigating the noise that may be present in water by means of a plurality of hydrophones installed on the base station 1 and/or on the underwater vehicle 2 wherein such hydrophones arranged at different positions and/or at different angles.

In addition, or in alternative to the aforementioned technique for noise mitigation, the system and in particular the base station 1 and the underwater vehicle 2 may comprise a noise mitigation software and/or hardware stage, schematically identified in FIG. 6 with the box having reference number **11*n***, that is configured for performing at least one of the signals processing for mitigating the adverse effects that the underwater noise may have on the ultrasonic and/or acoustic signal AS and/or of the optical signal OS.

In FIG. 6 the noise mitigation software and/or hardware stage **11*n* is connected to a first and a second hydrophone 11; this configuration shall not be considered limiting, since the noise mitigation software and/or hardware may be configured to cooperate also with a single hydrophone 11**, in order to perform an electronic processing of a received ultrasonic and/or acoustic signal AS only from a single source; in this latter case, the mitigation of noise by means of a reduction of a common noise may not be performed.

In other words, it can be considered that any among the ultrasonic and/or acoustic signal AS and optical signal OS may be provided with a noise portion—not useful for the purposes of allowing the reception of the relevant part of the message carried by the signal—and a payload portion, which actually contains the relevant message or information to be transmitted. Such signal processing may be one of the following list: a frequency-based noise mitigation processing, a matrix factorization noise mitigation processing, and an adaptive and/or predictive filtering for noise mitigation.

Among the several types of frequency-based noise mitigation processing, a Fast Fourier Transform noise mitigation processing may be preferred, in particular as—at it will be clearer from the following part of the description—the ultrasonic and/or acoustic signal AS, and/or the optical signal OS may be a numeric (digital) signal, in particular a binary signal comprising a plurality of 1s and 0s. The numeric signal may be transmitted according to a serial transmission. This implies that the ultrasonic and/or acoustic signal AS and/or the optical signal OS may be, at least temporarily or partially serial signals.

The underwater noise, considered in its integrity, may have several sources-artificial, human or animal sources, and natural sources (including thermal noise)—that have different properties.

The Applicant noted that according to IEEE Communications Magazine, January 2009 "Underwater Acoustic Communication Channels: Propagation Models and Statistical Characterization", by Milica Stojanovic, Northeastern University, and James Preisig, Woods Hole Oceanographic Institution, the power spectral density of the ambient noise in an underwater environment, at least due to the wind and shipping activity has a minimum substantially located between 20 kHz and 150 kHz, more in particular between 30 kHz and 110 kHz. Thus, in a preferred, non-limiting, embodiment, the frequency range for the ultrasonic and/or acoustic signal AS may be located in the [20-150] kHz range, preferably in the [30-110] kHz range. In particular, the Applicant notes that the typical noise spectrum is from 140 dB re 1 $\mu Pa^2$/Hz at 1 Hz to about 30 dB re 1 $\mu Pa^2$/Hz at 100 kHz.

Preferably, the optical signal OS may have a wavelength substantially close to the violet/blue region of the visible spectrum; this helps optimizing the maximum reachable length of transmission of the optical signal OS between the base station 1 and the underwater vehicle 2, as water has a minimum of absorption around the aforementioned region. Where possible, i.e. in case the bandwidth of the optical signal OS so allows, it would be thus preferable to tune the first optical communication device 12 or the second optical communication device 22 to have a carrier frequency (or carrier frequencies, should the modulation scheme for the optical signal OS cause a variation of the carrier frequency) centered around the aforementioned window.

The optical signal OS and/or the ultrasonic and/or acoustic signal AS may be modulated according to a predefined modulation scheme. The present disclosure shall not be considered in principle limited to a specific type of modulation, but preferably the system herein disclosed exploits numeric modulations, in particular at least one between a FSK modulation (Frequency Shift Keying), or an ASK modulation (Amplitude Shift Keying) or a PSK modulation (Phase Shift Keying) to modulate the ultrasonic and/or acoustic signal AS.

For the purpose of optimizing (lowering) the impact of the underwater noise in the transmission and reception of the ultrasonic and/or acoustic signals AS, in an embodiment the FSK modulation is such that 0s are transmitted at a nominal frequency of substantially 80 kHz, and 1s are transmitted at a nominal frequency of 70 kHz or vice versa. In general, when transmitting with an FSK modulation, it is preferable that at least a 5 kHz distance and, more preferably, at least 10 kHz distance, is kept between the at least two carriers used for transmitting the signal. In an embodiment, the first and the second carrier used for transmitting the at least one ultrasonic and/or acoustic signal AS are spaced with a fixed guard interval, and this guard interval may be 5 kHz or 10 kHz. Alternatively the system herein disclosed may be configured to allow the variation of the first and the second carrier used for transmitting the at least one ultrasonic and/or acoustic signal AS.

Preferably, for the purposes of allowing a proper underwater transmission of signals, a FSK modulation may be preferred at least for the ultrasonic and/or acoustic signal AS, in particular since it may be more effective to reduce the influence of the underwater noise in the ultrasonic and/or acoustic frequencies over the payload portion of the signal.

Figure 4:
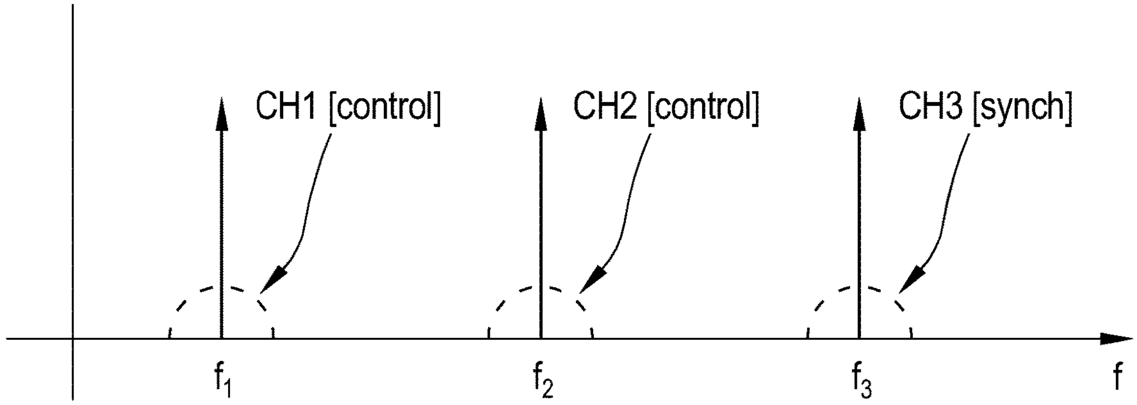
FIG. 4 shows a schematic view of frequency-spaced transmission channels for controlling and synchronizing the base station with the underwater vehicle.

In a preferred, non-limiting, embodiment, the system herein disclosed is configured for performing the transmission of at least the ultrasonic and/or acoustic signal AS on a plurality of channels. In particular the base station 1 and the underwater vehicle 2 are configured to transmit the ultrasonic and/or acoustic signal AS on a plurality of frequency-spaced transmission channels Ch1, Ch2, Ch3. Specifically, in an embodiment at least one between the transmission of the ultrasonic and/or acoustic signal AS or the reception of the ultrasonic and/or acoustic signal AS takes place simultaneously on said plurality of frequency-spaced transmission channels Ch1, Ch2, Ch3. In detail, FIG. 4 shows a schematic representation wherein the plurality of frequency-spaced transmission channels Ch1, Ch2, Ch3 are respectively centered at a first center frequency f1, at a second center frequency f2, and at a third center frequency f3.

In an embodiment, the three frequency-spaced transmission channels Ch1, Ch2, Ch3 are equally spaced. Assuming $f1<f2<f3$, this means that the frequency span between the first center frequency f1 and the second center frequency f2 is substantially equal to the frequency span between the second center frequency f2 and the third center frequency f3. Using an FSK modulation may imply that the first and the second data channels Ch1, Ch2 may be actually used for transmitting 0s and 1s.

In a specific embodiment at least one, among the ultrasonic and/or acoustic signals AS that are transmitted on said plurality of channels Ch1, Ch2, Ch3 by the base station 1 and/or by the underwater vehicle 2, is modulated with a FSK modulation; preferably, all the ultrasonic and/or acoustic signals AS that are transmitted on said plurality of channels Ch1, Ch2, Ch3 by the base station 1 and/or by the underwater vehicle 2, are modulated with a FSK modulation.

In a preferred and non-limiting embodiment, the plurality of channels Ch1, Ch2, Ch3 comprises: a first channel Ch1, a second channel Ch2, a third channel Ch3. Two among those three channels Ch1, Ch2, Ch3 are used for transmitting simultaneously an ultrasonic and/or acoustic signal AS, and the remaining channel is used for receiving an ultrasonic and/or acoustic signal AS. This is only a non-limiting example of a full-duplex communication over the ultrasonic and/or acoustic logic channel.

Such frequency spaced transmission channels Ch1, Ch2, Ch3 may be spaced in such a way that once an ultrasonic and/or a transmission signal is transmitted on one of said channels, e.g. the second channel Ch2, its spectrum does not interfere with the spectrum of the immediately adjacent channel. This is particularly important should simultaneous transmissions of ultrasonic and/or acoustic signals AS take place on two adjacent channels, in order to avoid the risk of interference that may compromise the quality of reception of the signal.

The aforementioned usage of a frequency-spaced transmission channel technique may be further used, even alternatively with respect to the ultrasonic and/or acoustic signals AS, also for the optical signal OS. In this latter case, it is clear that the frequency spaced transmission channel may, when considered overall, be across the visible and ultraviolet domain, or across the infrared and the visible domain.

The ultrasonic and/or acoustic signal AS may carry control and/or motion data or synchronization data. The control and/or motion data is specifically configured to cause a control of the underwater vehicle 2 by means of the base station 1 or to cause a control of the base station 1 by means of the underwater vehicle 2, or to manage the relative motion that takes place between the base station 1 and the underwater vehicle 2. Synchronization data is required since the protocol of transmission of the ultrasonic and/or acoustic signal AS herein disclosed is asynchronous.

Preferably, albeit in a non-limiting extent, the system is configured to perform a transmission of control and/or motion data on at least one first channel Ch1 of the plurality of channels Ch1, Ch2, Ch3 and to perform a transmission of synchronization data on a second channel Ch2 (or Ch3) of the plurality of channels Ch1, Ch2, Ch3. In the embodiment wherein three channels are present, control and/or motion data is transmitted, optionally simultaneously, on the first channel Ch1 and on the second channel Ch2, while the synchronization data is transmitted on the third channel Ch3.

It may be thus be inferred that at least one channel (e.g. the first or the second channel) of the plurality of channels Ch1, Ch2, Ch3 or, preferably, two channels (e.g. the first and the second channel) of the plurality of channels Ch1, Ch2, Ch3 is (or are) data channels, on which control and/or motion data is transmitted; instead one of the plurality of channels, e.g. the third channel Ch3, is a synchronization channel, over which the transiting signal carries data that is specifically configured to keep or adapt the synchronization between the transceiving of ultrasonic and/or acoustic signals AS on the first, or on the first and the second, channel(s).

This implies that the base station 1 and the underwater vehicle 2 may be configured to transmit at least part of said ultrasonic and/or acoustic signal AS, preferably the ultrasonic and/or acoustic signal AS transceived on said at least one data channel Ch1, Ch2 asynchronously or according to an asynchronous protocol. A step of synchronization takes place by means of a transmission of a synchronizing ultrasonic and/or acoustic signal AS on at least one synchronization channel Ch3 of the plurality of frequency-spaced transmission channels Ch1, Ch2, Ch3.

It is further noted that even if the multi-channel configuration is here described specifically for the transmission of ultrasonic and/or acoustic signal, in an embodiment such multi-channel configuration may apply also, or in alternative, to the transmission of optical signals OS. Thus at least one between the first hydrophone 11 and the second hydrophone 21 or, when present, the first plurality of hydrophones 11 and the second plurality of hydrophones 21, and the first optical communication device 12 and the second optical communication device 22 is configured to transmit signals on a plurality of frequency-spaced channels.

The Applicant has further conceived a specific data structure for the messages that are transmitted by means of the ultrasonic and/or acoustic signal AS and/or by means of the optical signal OS. In detail, such structure may be adopted for the embodiment of the base station 1 and/or of the underwater vehicle 2 provided with the at least one specifically adapted or configured hydrophone and with the optical communication devices as above disclosed and for further embodiments of base stations and/or of underwater vehicles operating with known transmission and receiving devices on the ultrasonic and/or acoustic band or on the optical band.

The data structure for the messages is specifically destined to numeric signals, in particular to binary-type signals, and more in particular to packet-type signals. As schematically represented in FIG. 7, the structure comprises the fields of the following list: a command type field, containing data relating to the type of command provided to, or received by, the underwater vehicle 2; a payload field, containing data associated to said type of command provided to, or received by, the underwater vehicle 2; a message number identification field; a checksum field. The presence of all the following fields shall not be considered limiting, as in another embodiment—which anyway is not preferred—at least one of the fields of the previous list is present.

The above data structure is particularly suitable for providing commands and/or control messages, or response messages, in a wireless communication taking place between the base station 1 and the underwater vehicle 2. In particular, through the aforementioned data structure a reprogramming of the underwater vehicle 2 is made possible.

The command type field contains in detail numeric data that is used to identify or control whether the at least one between the base station 1 or the underwater vehicle 2 is responsive, e.g. is within the maximum range allowed by the specific transmission taking place on one among the ultrasonic and/or acoustic logic channel or the optical channel. In this case the numeric data may be of a "ping" type, which imposes to the addressee of the message (the base station 1, or the underwater vehicle 2) to provide a response to the incoming messages, in particular imposing a response to the incoming message by means of the same logic channel on which the message has been received or on another logic channel. The numeric data may be of an "ack" type, which provides to the sender (the underwater vehicle 2, or the base station 1) with an adequate response. In an embodiment, thus, when a transmission of a message wherein the structure contains a "ping" type numeric data takes place, this transmission requires the reception of a message containing a structure being provided with an "ack" (acknowledgement) type numeric data. An absence of such a response may be indicative of a malfunction or of the fact that the addressee of the message may be beyond the limit of the communication range for the specific logic channel used for transmitting the message.

Alternatively, the command type field may contain numeric data that is used to define a mission, e.g. a mission for the underwater vehicle 2, or to provide a report of the mission already defined. In this latter case such numeric data may be of a "mission" type or of a "report" for the mission type.

The payload field contains data associated to the type of command provided to, or received by, the base station 1 or the underwater vehicle 2 and specifically at least one of the following data:

- location data, which is of an "object" data type, and which expresses the coordinates (longitude, latitude) at which the underwater vehicle 2 and/or the base station 1 shall direct or at which the underwater vehicle 2 and/or the base station 1 actually is;
- battery level data, which is of a "string" data type, and which expresses the level, e.g. in percentage between 0% and 100%, of the residual charge or capacity of the battery of the underwater vehicle 2;
- status data, which is of a "string" data type and which expresses the status of the device which has received the message, and which can be associated to a response message wherein the data type is "ack";
- commands data, which is of a "array" data type, and which contains commands to be provided to the addressee of the message, e.g. commands controlling or imposing a motion to a specific direction or coordinates set provided with the location data;
- skipping data, which is of a "array" data type, and which allows the addressee of the message to skip the message wherein the skipping data is contained;
- commands report data, which is of an "array" data type, and which allows the addressee of a command provided with the commands data of a message structure previously received to respond to the sender identifying whether it has been possible to execute the command and, if needed or applicable, which is the result of the command;
- sequence number data, which is of a "number type", and which allows the addressee of a command provided with the commands data of several message structures previously received to identify a specific order of the command with respect to other commands already received but, e.g., not already fully performed.

In a preferred and non-limiting embodiment, the status data may be one of the following list: "doing mission", which indicates that the addressee of a response to a sent command is performing the command imposed by the sender; "searching", which indicates that the addressee of a response to a sent command is performing a search according to parameters provided by the sender; "lost", which indicates that the addressee has lost his position and/or has failed to reach the provided destination specified with the location data; "returning home", which indicates that the addressee, in particular the underwater vehicle 2, is directed to the location at which the base station 1 lies; "heading to mission", which indicates that the addressee, in particular the underwater vehicle 2, is directed to a location specified by the location data of the structure of a former message for then performing a specified mission; "emergency", which indicates a malfunction of the sender (or, more in general, of one between the base station 1 or the underwater vehicle 2) and/or an immediate suspension of the mission carried out by the base station 1 or by the underwater vehicle 2.

In a preferred, non-limiting, embodiment, the commands data, being of an array type, may have several parts, in particular at least four subsequent parts, and, preferably, may assume the at least one of the forms of the following table:

| {action} | {parameter} | {adjective} | {object} |
|---|---|---|---|
| Scan | [none] | [none] | Seabed |
| Calculate | Length | Color | Surface |
| Locate | Height | Shape | Home |
| Grip | Width | Direction | Trained nouns |
| Release | Depth | Size | Path to image |
| Return | | | |
| enter | | | |

From the above table, it is thus clear that the commands data comprise a plurality of portions; the plurality of portions comprise at least one between the portions of the following list: an action portion configured to identify a specific action that the one between the base station 1 or the underwater vehicle 2 shall perform; a parameter portion comprising data associated to said specific action, in particular metric data associated to the specific action; an adjective portion, comprising data associated to the data of the parameter portion; an object portion, containing data referring to a destination of a motion or of an action carried out by one of the base station 1 or the underwater vehicle 2.

In a command array, multiple commands are separated by means of a predefined sign; in an embodiment the predefined sign of separation is "-"; this specific type of separation sign shall not be intended as limiting.

Some commands may have several parts, e.g. four parts, while other commands may have only one part or a less number of parts, e.g. three parts.

In a preferred, non-limiting, embodiment, in an array commands are sorted by priority.

As schematically shown in the aforementioned table at least one part of the command, in particular at least a first part of the command, is an "action" part; an "action" part is a part of a command destined to cause the execution of a specific activity by the addressee of the command.

When the "action" part is "scan", the addressee of the command starts to scan the seabed; when the addressee is specifically the underwater vehicle 2, the seabed scanning operation takes place by means of an automatic activation of at least one item configured to allow the reporting of a result of the scan; in an embodiment which is clearly not limiting, the seabed scanning operation takes place by means of an automatic activation of at least one item selected in the following list of items: one video camera, one temperature sensor, one underwater microphone.

When the "action" part is "calculate", the addressee of the command starts to calculate at least one specific measurement unit between the length and/or the color of a surface, in particular at least one between the length and/or the color of the surface of the seabed. In a preferred embodiment, when the addressee is specifically the underwater vehicle 2, the calculation takes place by means of an activation of at least one camera configured for allowing the identification of the color of a surface and, if needed, by means of an activation of a illumination device.

The length of the surface may be calculated electronically by means of at least one of the following techniques: an electronic imaging processing, performed on the images captured by means of the camera which has been already activated; a measurement of a variation of coordinates assumed by the underwater vehicle 2 by means of global communication satellite positioning system or any non-satellite positioning radio source, a pitometric logging.

When the "action" is "locate", the addressee of the command starts to calculate at least one between a height and/or a shape of an item, in particular a homing device, e.g. the height and/or the shape of the base station 1. This allows performing a proper underwater relative positioning between the base station 1 and the underwater device 2.

The height and/or the shape of item may be calculated electronically by means of an electronic imaging processing performed on the images captured by means of the camera that has been already activated.

When the "action" is "grip", the addressee of the command activates at least one gripper in a direction and with a width defined by the two parts "width" and "direction". The "direction" part may define the direction towards which the gripper shall be moved; such direction may be referred with respect to a predefined part of the addressee, e.g. the front part of the underwater vehicle 2. "Width" and "direction" parts will cause an automated activation of at least one actuator once the commands is received. The "trained nouns" part will refer to specific types of items that the addressee of the command is already configured to grab, and in particular will refer to specific types of items that the addressee of the commands knowns at least in terms of width at which the gripper shall be opened.

When the "action" is "release", the addressee of the command activates at least one gripper to release an already gripped item up to the destination referred by the "path to image" object. It may be thus considered that while the "grip" command is a command that refers to a closure of the gripper up to a predetermined width, the "release" command is a command that refers to an opening of the gripper up to a predetermined width.

In a preferred and non-limiting embodiment, the command may further be "return" or "enter"; the "return" command may cause an abort of the previously confirmed command or a returning in a position close or substantially coinciding to that of sender, e.g. the position of the base station 1. "Enter" command may cause the actual confirmation and thus the actual execution of a command previously transmitted to the addressee.

Skipping data preferably contains a binary mask to the commands showing which can be skipped and which, in contrast, cannot be skipped. In an embodiment, when the binary mask is "1", the command can be skipped; in contrast, when the binary mask is "0", the command cannot be skipped.

Commands report data contains an integer mask to the commands showing the progress in percentage of completion of the command performed by the addressee, e.g. by the underwater vehicle 2. Preferably, albeit in a non-limiting extent, the integer mask ranges from 0 to 100.

It is herewith provided a non-limiting example of message that exploits the aforementioned data structure:

{"type": "ping", "payload": {"location": {"lat": "42.5321", "long": 31.25, "distance": 23.3, "angle": 32.5}, "battery_level": "99%", "status": "performing mission"}, "msg_no": 2, "crc": "011010010100110101"}

In a preferred and non-limiting embodiment, the message is enclosed in a frame having an overall size of 11 bytes and which can be classified in three sections comprising a message identification section having a size of 1 byte, a payload section having a size of 8 bytes and a checksum section having a size of 2 bytes.

As it may be noted from the above example, the method according to the present disclosure includes a step of error detection and/or correction, that may be applied to the ultrasonic and/or acoustic signal AS and/or to optical signal OS, for the purpose of allowing a prompt detection of errors in the data received by and of the underwater vehicle 2 or the base station 1. This, as well, means that at least one between the base station 1 and the underwater vehicle 2 may be configured to automatically detect and/or correct data transmission errors on any between the ultrasonic and/or acoustic signal AS and/or the optical signal OS. At least one between the base station and the underwater vehicle 2 are configured to carry out an error-detection and/or error-correction algorithm, that is applied to the ultrasonic and/or acoustic signal AS and/or the optical signal OS.

Several algorithms of error detection and/or correction may be applied, but in an embodiment, a CRC (Cyclic Redundancy Check) may be applied. Request for retransmission of corrupted data from the base station 1 to the underwater vehicle 2 or vice versa may be conveniently performed especially in those cases wherein several plurality of frequency-spaced transmission channels Ch1, Ch2, Ch3 is present.

Resuming, when the base station 1 or the underwater vehicle 2 receive the message, a data processing unit performs a step of electronic processing of the message included in the ultrasonic and/or acoustic signal received and then performs an adaptation of the configuration and/or the motion and/or the actuation of the base station 1 or the underwater vehicle 2 in accordance to the electronic processing of the message.

FIG. 8 discloses schematic diagram of operating hardware and/or software units in the system of the present disclosure. As it can be clearly seen, a preferred and non-limiting embodiment of the base station 1 comprises first a communication handler 1*h* that is configured to manage all the communications taking place between the base station 1 and the underwater vehicle 2. The communication handler 1*h* is in particular to manage the reception and/or the transmission of the ultrasonic and/or acoustic signal AS and/or of the optical signal OS through respectively the first hydrophone 11 (or, when present, the first plurality of hydrophones 11) and the first optical communication device 21.

The base station 1 further comprises a docking handler 1*d*, which is configured specifically to manage all the activities associated to the docking of the underwater vehicle 2 to the base station 1. In particular, the docking handler 1*d* of the base station 1 is configured to co-operate with the correspondent of the underwater vehicle 2 and to set up a logic bi-directional communication therewith.

The base station 1 further comprises a charging control unit (CCU) 1*c* configured to control the energy transfer to the first recharging connector 1*r* for allowing recharging the battery of the underwater vehicle 2. The charging control unit (CCU) 1*c* is thus operatively connected to the first recharging connector 1*r*. In an embodiment the charging control unit (CCU) 1*c* is also operatively connected to the docking handler 1*d* at least to timely start the transfer of energy through the first recharging connector 1*r* at the moment the docking of the underwater vehicle 2 to the base station 1 is fully completed.

The underwater vehicle 2 comprises a command handler 2*h* that is configured to manage the execution of all the commands received by the base station 1, in particular by the communication handler 1*h* of the base station 1 and to cause the execution of such commands. The command handler 2*h* is operatively connected to the second hydrophone 21 (or, when present, the second plurality of hydrophones 21) and the second optical communication device 22, in order to be capable of managing commands received through the ultrasonic and/or acoustic signals AS and through the optical signal OS.

The underwater vehicle 2 further comprises a docking handler 2*d*, which is configured to operatively cooperate with the docking handler 1*d* of the base station 1. In particular the docking handler 2*d* of the underwater vehicle 2 may cause the activation and/or regulation of the power provided to the motors of the underwater vehicle 2 in order to cause a proper approximation of the underwater vehicle 2 to the base station 1 and, more in detail, a proper approximation of the second recharging connector 2*r* to the first recharging connector 1*r*. In use, the communication that takes place between the base station 1 and the underwater vehicle 2 during the docking may specifically exploit the ultrasonic and/or acoustic signals AS.

The underwater vehicle 2 is further provided with a charging control unit (CCU) 2*c* configured to control the energy transfer coming from the first recharging connector 1*r* for allowing recharging the battery of the underwater vehicle 2. The charging control unit (CCU) 2*c* is thus operatively connected to the second recharging connector 2*r*. The charging control unit (CCU) 2*c* is further operatively connected to the battery, at least in such a way to perform a measurement of the percentage of charge thereof. In an embodiment, the charging control unit (CCU) 2*c* is also operatively connected to the docking handler 2*d* at least to timely allow the starting of the charge of the battery through the second recharging connector 2*r* when the docking of the underwater vehicle 2 to the base station 1 is fully completed.

The underwater vehicle 2 is further provided with main unit 2*m* which is configured to overall manage all the operations and the activations/deactivations of the further units already disclosed for the underwater vehicle 2 as well as for managing the activation/deactivation and control of the gripper, the camera, the thermometer and any other sensor that may be installed on the underwater vehicle 2.

At least one of the units of the underwater vehicle 2 and/or of the base station 1 can be realized with a general-purpose processor, running a specific software program, stored on a non-transitory memory support. The software program software code portions that—once executed—cause the operations above disclosed.

In particular, a specific embodiment of the software program may be configured to cause:

- a step of transmission of at least one ultrasonic and/or acoustic signal AS by means of at least one between the first hydrophone 11 and the second hydrophone 21, and/or
- a step of transmission of at least one optical signal OS by means of at least one between the first optical communication device 12 and the second optical communication device 22.

In another embodiment, the software program comprises software code portions that, once executed, cause the generation of a numeric signal, optionally a binary-type and/or a packet-type numeric signal, comprising a message having a structure comprising at least one of the fields of the following list: a command type field, containing data relating to the type of command provided to, or received by, one between the base station 1 or the underwater vehicle 2; a payload field, containing data associated to said type of command provided to, or received by, one between the base station 1 or underwater vehicle 2; a message number identification field; a checksum field.

In particular, in an embodiment, the software program comprises software code portions that, once executed, cause the transmission of said numeric signal with at least one between the first hydrophone 11 or the second hydrophone 21 as an ultrasonic and/or acoustic signal AS and/or with at least one between the first optical communication device 12 and the second optical communication device 22.

It may be further noted that the software program may comprise software code portions that once executed cause a noise mitigation electronic signal processing in order to electronically mitigate the effect of the underwater noise; the signal processing may comprise at least one of the processing operations of the following list: a frequency-based noise mitigation processing, in particular a Fast Fourier Transform noise mitigation processing; a matrix factorization noise mitigation processing; an adaptive and/or predictive filtering for noise mitigation.

The software program may be further configured to mitigate underwater noise by means of a redundant transmission algorithm, performing a transmission of the second signal to the plurality of hydrophones 11, 21, in particular providing the simultaneous transmission of the second signal to a plurality of hydrophones 11, 21 arranged on the base station 1 and/or on the underwater vehicle 2.

In addition or alternative to the above techniques, the software program may be configured to perform the selection of a particular frequency range far from known noise sources and to cause the transmission and/or reception of the concerned signal (i.e. the optical signal and/or the ultrasonic and/or acoustic signal) on the selected frequency range. Albeit this shall not be considered limiting, the selection of the particular frequency range may be adaptive.

Alternatively, at least one of the units of the underwater vehicle 2 can be realized by means of an application specific purpose processor or integrated circuit, specifically configured for performing such operations. At least one of the units of the underwater vehicle 2 and/or of the base station 1 can be realized with an FPGA. The aforementioned software program can be written in any known language and in an embodiment shall be written in a language supporting the message structure as above described.

It is further noted that the several units above described and shown in FIG. 7 shall not be considered a strictly being separated, especially physically separated; at least partially, the units shown in FIG. 7 can be considered software units and/or subroutines, configured to perform specific operations as above disclosed. In an embodiment, thus it may be considered that the base station 1 or the underwater vehicle 2 may be provided with a control unit comprising:

a first communication line, configured to be operatively connected with at least a first hydrophone 11, 21, the control unit being configured to:

receive a first signal, in particular an electric signal, from the at least a first hydrophone 11, 21, wherein the first signal is a transduction signal of the ultrasonic and/or acoustic signal AS received with the at least a first hydrophone 11, 21, and/or to transmit a second signal, in particular an electric signal, to the at least a first hydrophone 11, 21, wherein the second signal is configured to cause a transmission of an ultrasonic and/or acoustic signal AS by the at least a first hydrophone 11, 21, a second communication line, configured to be operatively connected with at least an optical communication device 12, 22, the control unit being configured to:

receive a third signal, in particular an electric signal, from the at least an optical communication device 12, 22, wherein the third signal is a transduction signal of the optical signal OS received by the at least an optical communication device 12, 22, and/or to transmit a fourth signal, in particular an electric signal, to the at least an optical communication device 12, 22, wherein the fourth signal is configured to cause a transmission of an optical signal OS by the at least one optical communication device 12, 22.

In particular, the control unit is configured to receive the first signal and to transmit the second signal on the first communication line, that is an input/output line, and to receive the third signal and to transmit the fourth signal on the second communication line, that is an input/output line.

In the following portion of the present description only the main features of such control unit will be specifically described. It shall be intended that the control unit may possess all the required configurations, circuits and/or adaptations to carry out any of the technical features above described for any among the base station 1, the underwater vehicle 2 or any of the steps of the wireless communication method above described. At least when installed on the underwater vehicle 2, the control unit is electrically fed by the battery.

In particular, the control unit may be configured to transmit the second signal to a specifically adapted hydrophone 11, 21 configured and/or adapted to transmit an ultrasonic and/or acoustic signal AS as above described, in particular adapted by means of an integration of a vibrator 11*r* and/or of an amplifier 11*a*.

The control unit comprises a selector, which is configured for selecting an activation of the at least a first hydrophone 11, 21 and/or an activation of the at least an optical communication device 12, 22 in accordance to at least one predetermined criterion of the list comprising at least available and/or required bandwidth, distance between the base station 1 and the underwater device 2, respective position between the base station 1 and the underwater device 2, streaming requirement, control requirement.

In particular the selector of the control unit may be configured to cause a simultaneous activation of the at least a first hydrophone 11, 21 and of the at least an optical communication device 12, 22 by simultaneously transmitting the second signal to said at least a first hydrophone 11, 21 and the fourth signal to the at least an optical communication device 12, 22.

In particular, the second signal is configured to cause an emission of an ultrasonic and/or acoustic signal AS in the [20-150] kHz range, preferably in the [30-110] kHz range. The Applicant has conceived at least one specific embodiment wherein the control unit is configured to allow the selection of the specific frequency at which the ultrasonic and/or acoustic signal AS shall be transmitted by the hydrophone and/or to allow the selection of the wavelength at which the optical signal OS shall be transmitted and/or to allow the selection of the infrared or ultraviolet or visible subdomain in which the optical signal OS shall be transmitted. Of course, this latter opportunity implies that the concerned optical communication device shall be suitable to allow a proper signal transmission in all the aforementioned subdomains.

In a specific embodiment, the control unit may be configured to cause the transmission of the ultrasonic and/or acoustic signal on a plurality of frequency-spaced transmission channels Ch1, Ch2, Ch3, optionally simultaneously on the plurality of frequency-spaced transmission channels Ch1, Ch2, Ch3; albeit this shall not be considered limiting, the control unit may be configured to modulate the second signal according to one of the following modulation schemes: FSK modulation, ASK modulation, PSK modulation. It is clear that in this latter case the control unit is configured to transmit the second signal in a form of a numeric-type signal, in particular binary-type and/or packet-type signal, suitable to match with a keying-type modulation without further adaptations.

In an embodiment, the control unit is configured to transmit the second signal at appropriate time slots in accordance to a synchronization provided by the reception of the first signal, in particular being configured to transmit the second signal in order to cause the transmission of the ultrasonic and/or acoustic signal AS on at least one data channel Ch1, Ch2 of the plurality of frequency-spaced transmission channels Ch1, Ch2, Ch3 and to receive the first signal associated to a synchronization channel Ch3 of the plurality of transmission channel.

The control unit may be configured to perform a signal processing on at least the first signal, in order to electronically mitigate the effect of the underwater noise; the signal processing may comprise at least one of the processing operations of the following list: a frequency-based noise mitigation processing, in particular a Fast Fourier Transform noise mitigation processing; a matrix factorization noise mitigation processing; an adaptive and/or predictive filtering for noise mitigation.

The control unit may be further configured to perform a transmission of the second signal to a plurality of hydrophones 11, 21, in particular providing the simultaneous transmission of the second signal to a plurality of hydrophones 11, 21 arranged on the base station 1 and/or on the underwater vehicle 2. Furthermore, the control unit may be further configured to perform the selection of a particular frequency range far from known noise sources and to cause the transmission and/or reception of the concerned signal (i.e. the optical signal and/or the ultrasonic and/or acoustic signal) on the selected frequency range.

In case any of the base station 1 or the underwater vehicle 2 are provided with three or more hydrophones, the control unit may be configured to allow a user select among the three or more hydrophones as addressees for the second signal.

In an embodiment, at least the first signal and/or the second signal contain messages provided with a structure comprising at least one of the fields of the following list: a command type field, containing data relating to the type of command provided to, or received by, the underwater vehicle 2; a payload field, containing data associated to said type of command provided to, or received by, the underwater vehicle 2; a message number identification field; a checksum field.

It may be further noted that the control unit comprises at least one interface, optionally at least one electronic interface, configured to be operatively connected with a position and/or direction sensing element, in particular at least a radiofrequency positioning sensor and/or a pitometer, and/or a magnetic and/or inertial compass; said interface being configured to receive a position and/or direction sensing signal, in particular an electric position and/or direction sensing signal. Such sensing signal may be used to determinate a specific position for the base station 1 or the underwater vehicle 2 and to allow a proper motion thereof along a predetermined path in order to perform the mission or any activity specified in the messages as above described.

Further preferably, the control unit is configured to control a provision of electric energy to a first recharging connector 1*r*, optionally a wireless first recharging connector 1*r*, of the base station 1; the provision of electric energy is destined to cause a recharging of the battery of said underwater vehicle 2. Alternatively, the control unit is configured to control the flow of an electric energy to a battery of the underwater vehicle 2 through the second recharging connector 2*r* of the underwater vehicle 2 and/or is configured to monitor the recharging status of the battery of said underwater vehicle 2 and to cause the transmission of a battery recharging control signal to said base station 1, optionally through said first signal. In particular, the battery recharging control signal may carry, or be, the battery level data above identified.

In a further specific embodiment, the control unit may be provided with:

- a first communication line, configured to be operatively connected with at least a first hydrophone 11, 21, the control unit being configured to:
  - receive a first signal, in particular an electric signal, from the at least a first hydrophone 11, 21, wherein the first signal is a transduction signal of the ultrasonic and/or acoustic signal AS received with the at least a first hydrophone 11, 21, and/or to
  - transmit a second signal, in particular an electric signal, to the at least a first hydrophone 11, 21, wherein the second signal is configured to cause a transmission of an ultrasonic and/or acoustic signal AS by the at least a first hydrophone 11, 21,
- a second communication line, configured to be operatively connected with at least an optical communication device 12, 22, the control unit being configured to:
  - receive a third signal, in particular an electric signal, from the at least an optical communication device 12, 22, wherein the third signal is a transduction signal of the optical signal OS received by the at least an optical communication device 12, 22, and/or to
  - transmit a fourth signal, in particular an electric signal, to the at least an optical communication device 12, 22, wherein the fourth signal is configured to cause a transmission of an optical signal OS by the at least one optical communication device 12, 22,
- and at least one among the first, the second, the third and the fourth signal, is a numeric signal, optionally a binary and/or a packet-type numeric signal, comprising a message having a structure comprising at least one of the fields of the following list: a command type field, containing data relating to the type of command provided to, or received by, one between the base station 1 or the underwater vehicle 2; a payload field, containing data associated to said type of command provided to, or received by, one between the base station 1 or the underwater vehicle 2; a message number identification field; a checksum field. Further details about the aforementioned fields are provided in the previous part of the description, and thus are not repeated.

At least one between the ultrasonic and/or acoustic signal AS and the optical signal OS may contain encrypted data. The data is encrypted according to an at least one predefined algorithm. It is thus apparent that at least one between the at least one base station 1 and/or the at least one underwater vehicle 2 may be provided with encryption module and/or a decryption module. In a specific embodiment, both the at least one base station 1 and the at least one underwater vehicle 2 may be provided with an encryption module and with a decryption module. The "module" shall not be intended in a limiting way as being a hardware module. With the word "module", for the purposes of the present disclosure, it is intended a hardware, software or mixed hardware-software module conceived to perform the encryption and/or decryption data processing. Standard or proprietary encryption and/or decryption algorithms may be used. The step of transmission of an encrypted ultrasonic and/or acoustic signal AS and/or optical signal OS may thus be followed by a step of reception and, subsequently, by a step of decryption of said signal(s). Specifically, when the system and method herein described include said plurality of frequency-spaced transmission channels Ch1, Ch2, Ch3, at least part, and preferably all such channels Ch1, Ch2, Ch3 may support the transmission of encrypted data.

The at least one base station 1 and the at least one underwater vehicle 2 may be configured to select among several encryption and/or decryption algorithm; an electronic synchronization, that may take place automatically, between the at least one base station 1 and the at least one underwater vehicle 2, or should the case may be between a first and a second base station 1 and/or between a first and a second underwater vehicle 2, may take place in order to allow encryption of data and decryption of data according to a same selected algorithm of encryption and decryption.

Encryption of data takes place upstream the step of modulation, and subsequent transmission of the at least one between the ultrasonic and/or acoustic signal AS and the optical signal OS according to the specific modulation scheme selected for the physical transmission. Decryption of data takes place downstream the step of reception and subsequent demodulation of the at least one between the ultrasonic and/or acoustic signal AS and the optical signal OS.

The invention claimed is:

1. A wireless communication method between a base station for an underwater vehicle and an underwater vehicle, comprising:

- providing the base station with at least a first hydrophone,
- providing the underwater vehicle, configured to be operatively coupled with the base station, with at least a second hydrophone,
- adapting and/or configuring the first hydrophone and the second hydrophone in order to allow a transmission and reception of ultrasonic and/or acoustic signals,
- providing the base station with at least a first optical communication device, and providing the underwater vehicle with at least a second optical communication device, the first optical communication device and the second optical communication device comprising an optical transmitter and/or an optical receiver, the provision allowing setting up a signal transceiving between the base station and the underwater vehicle, transmitting at least one ultrasonic and/or acoustic signal by at least one of the first hydrophone and the second hydrophone, and/or transmitting at least one optical signal by at least one of the first optical communication device and the second optical communication device, and defining a plurality of frequency-spaced transmission channels of ultrasonic and/or acoustic signal transmission, wherein transmitting the at least one ultrasonic and/or acoustic signal takes place on said plurality of frequency-spaced transmission channels, wherein transmitting the at least one ultrasonic and/or acoustic signal takes place according to a FSK modulation, or an ASK modulation, or a PSK modulation, and wherein the method further comprises a synchronization of a control and/or of a motion of the underwater vehicle with respect to the base station, the synchronization taking place utilizing the at least one ultrasonic and/or acoustic signal, the transmitting the at least one ultrasonic and/or acoustic signal comprising transmitting control and/or motion data on at least one data channel of the plurality of frequency-spaced transmission channels and/or comprising transmitting synchronization data on at least one synchronization channel of the plurality of frequency-spaced transmission channels, wherein transmitting the at least one ultrasonic and/or acoustic signal comprises at least partially asynchronous transmission, and wherein transmitting the at least one ultrasonic and/or acoustic signal comprises transmitting asynchronously part of said at least one ultrasonic and/or acoustic signal on one data channel of the plurality of frequency-spaced transmission channels and comprises a transmission of a synchronizing ultrasonic and/or acoustic signal on the at least one synchronization channel of the plurality of frequency-spaced transmission channels.

2. The wireless communication method according to claim 1, the method comprising selecting an activation of the at least one of the first hydrophone and the second hydrophone and/or an activation of at least one of the first optical communication device and the second optical communication device, wherein said selecting takes place in accordance to at least one predetermined criterion, the at least one predetermined criterion comprising available and/or required bandwidth, distance between the base station and the underwater vehicle, respective position between the base station and the underwater vehicle, streaming requirement, control requirement; and and wherein said predetermined criterion comprises at least identifying whether control and/or report command data or video and/or imaging and/or audio streaming data shall be transmitted and:

if control and/or report command data shall be transmitted, performing the activation of at least one of the first hydrophone and the second hydrophone and/or the activation of at least one of the first optical communication device and the second optical communication device; and if video and/or imaging and/or audio streaming data shall be transmitted, performing the activation of at least one of the first optical communication device and the second optical communication device.

3. The wireless communication method according to claim 1, wherein the transmitting of the at least one ultrasonic and/or acoustic signal is a non-directive transmission and/or takes place when the base station and the underwater vehicle are at a first distance and/or wherein the transmitting of the at least one optical signal is a directive transmission and/or takes place when the base station and the underwater vehicle are at a second distance, the first distance being greater or equal to the second distance, the second distance being lower than 100 m, or lower than 80 m, or lower than 60 m, the first distance being lower than 500 m, or lower than 300 m, or lower than 200 m.

4. The wireless communication method according to claim 1, wherein adapting and/or configuring the first hydrophone and second hydrophone in order to allow a transmission and reception of ultrasonic and/or acoustic signals comprises providing at least one of the first hydrophone and the second hydrophone with at least one of a vibrator and/or an amplifier, the vibrator and/or the amplifier being specifically configured to allow the transmission of an ultrasonic and/or acoustic signal.

5. The wireless communication method according to claim 1, wherein the at least one ultrasonic and/or acoustic signal comprises a noise portion and a payload portion, and wherein the method comprises mitigating underwater noise, for reducing the noise portion and/or increasing a signal-to-noise ratio of the at least one ultrasonic and/or acoustic signal; and mitigating the underwater noise comprises at least one among:

selecting a frequency range for transmitting the at least one ultrasonic and/or acoustic signal, the frequency range being far from underwater noise sources;

providing the base station with at least a first plurality of hydrophones, and/or providing the underwater vehicle with a second plurality of hydrophones and simultaneously receiving the at least one ultrasonic and/or acoustic signal with the first plurality of hydrophones and with the second plurality of hydrophones, the first plurality of hydrophones and/or the second plurality of hydrophones comprising hydrophones arranged at different positions and/or at different angles; and electronically processing a received ultrasonic and/or acoustic signal utilizing noise mitigation software and/or hardware, performing at least one signals processing technique of the following list: a frequency-based noise mitigation processing; a matrix factorization noise mitigation processing; an adaptive and/or predictive filtering for noise mitigation.

6. The wireless communication method according to claim 1, wherein transmitting one or both of the at least one ultrasonic and/or acoustic signal and said at least one optical signal comprises transmitting a numeric signal comprising a message having a structure comprising at least one field of the following list: a command type field, containing data relating to a type of command provided to, or received by, the underwater vehicle; a payload field, containing data associated to said type of command provided to, or received by, the underwater vehicle; a message number identification field; and a checksum field; and the method further comprising a step of configuration and/or motion and/or actuation of at least one of the base station or the underwater vehicle, said step of configuration and/or motion and/or actuation comprising an electronic processing of said message and adapting a configuration and/or a motion and/or an actuation of said at least one of the base station or the underwater vehicle in accordance to the electronic processing of said message.

7. The wireless communication method according to claim 1, the method comprising:

providing a first underwater vehicle and a second underwater vehicle each configured to be operatively coupled with the base station, with at least a respective second hydrophone and controlling the first and the second underwater vehicle as slave units, controlled by the base station as a master unit utilizing the transmitting of the at least one ultrasonic and/or acoustic signal and/or utilizing the transmitting of the at least one optical signal, and/or providing a first base station with at least a first hydrophone and a second base station with at least a respective first hydrophone and controlling the first and the second base station as slave units, controlled by the underwater vehicle as a master unit utilizing the transmitting of the at least one ultrasonic and/or acoustic signal and/or utilizing the transmitting of the at least one optical signal.

8. The wireless communication method according to claim 1, wherein:

the base station is a docking station for said underwater vehicle, the base station comprises a first wireless recharging connector, configured for transferring electric energy to the underwater vehicle, the underwater vehicle is an unmanned underwater vehicle, provided with at least one electric motor for allowing motion of the underwater vehicle in water, the underwater vehicle is wirelessly controlled by the base station and comprises at least one battery and a second wireless recharging connector, configured for receiving the electric energy in use transferred by the first wireless recharging connector and for transferring said electric energy to the battery, and an approach and/or a positioning of the underwater vehicle relative to the base station is controlled by at least one of the at least one optical signal and the at least one ultrasonic and/or acoustic signal.

9. An underwater system comprising:

at least one base station for an underwater vehicle, the at least one base station comprising:

at least a first hydrophone, adapted and/or configured for transmitting and receiving ultrasonic and/or acoustic signals, and at least a first optical communication device, comprising an optical transmitter and/or an optical receiver; and at least one underwater vehicle, configured to be operatively coupled with the at least one base station, the at least one underwater vehicle comprising:

at least a second hydrophone, adapted and/or configured for transmitting and receiving ultrasonic and/or acoustic signals, and at least a second optical communication device, comprising an optical transmitter and/or an optical receiver, wherein at least one of the first optical communication device and the second optical communication device is configured to transmit at least one optical signal and wherein at least one of the first optical communication device and the second optical communication device is configured to receive said at least one optical signal, wherein the at least one base station is a docking station for said underwater vehicle, wherein the at least one base station comprises a first wireless recharging connector, configured for transferring electric energy to the at least one underwater vehicle, wherein the at least one underwater vehicle is an unmanned underwater vehicle, provided with at least one electric motor for allowing motion of the unmanned underwater vehicle in water, wherein the at least one underwater vehicle is wirelessly controlled by the at least one base station and comprises at least one battery and a second wireless recharging connector, configured for receiving the electric energy in use transferred by the first wireless recharging connector and for transferring said electric energy to the battery, and wherein an approach and/or a positioning of the at least one underwater vehicle relative to the at least one base station is controlled by at least one of the at least one optical signal and at least one ultrasonic and/or acoustic signal.

10. The system according to claim 9, comprising a hardware and/or software selector configured for selecting an activation of at least one of the first hydrophone and the second hydrophone and/or an activation of at least one of the first optical communication device and the second optical communication device, wherein said hardware and/or software selector is configured to select said activation in accordance with at least one predetermined criterion comprising an available and/or required bandwidth, a distance between the at least one base station and the at least one underwater vehicle, a respective position between the at least one base station and the at least one underwater vehicle, a streaming requirement, and a control requirement; and wherein the hardware and/or software selector is configured to identify whether a control and/or report command data or a video and/or imaging and/or an audio streaming data shall be transmitted and:

if the control and/or report command data shall be transmitted, said hardware and/or software selector causes the activation of at least one of the first hydrophone and the second hydrophone and/or the activation of at least one of the first optical communication device and the second optical communication device; and if the video and/or imaging and/or the audio streaming data shall be transmitted, said hardware and/or software selector causes the activation of at least one of the first optical communication device and the second optical communication device.

11. The system according to claim 9, wherein at least one of the first hydrophone and the second hydrophone comprises a vibrator and/or an amplifier, which are configured to allow transmission of the at least one ultrasonic and/or acoustic signal, and wherein said at least one ultrasonic and/or acoustic signal is an ultrasonic signal lying in a [20-150] KHz frequency range, or in a [30-110] kHz frequency range.

12. The system according to claim 9, wherein the at least one base station and the at least one underwater vehicle are configured to transmit the at least one ultrasonic and/or acoustic signal simultaneously on a plurality of frequency-spaced transmission channels and being configured to modulate, and subsequently transmit, the at least one ultrasonic and/or acoustic signal according to a FSK modulation, or an ASK modulation, or a PSK modulation.

13. The system according to claim 12, wherein said plurality of frequency-spaced transmission channels comprises at least one data channel and at least one synchronization channel, the at least one base station and the at least one underwater vehicle being configured to keep a synchronization of transmission of ultrasonic and/or acoustic signals on said at least one data channel utilizing data contained in an ultrasonic and/or acoustic signal transmitted on the synchronization channel.

14. The system according to claim 13, wherein at least part of said at least one ultrasonic and/or acoustic signal is asynchronous; and wherein at least one of the at least one base station and the at least one underwater vehicle is configured to transmit the at least part of said at least one ultrasonic and/or acoustic signal asynchronously or according to an asynchronous protocol and is configured to transmit a synchronizing ultrasonic and/or acoustic signal on the at least one synchronization channel of the plurality of frequency-spaced transmission channels.

15. The system according to claim 9, wherein the at least one base station comprises a first plurality of hydrophones and/or wherein the at least one underwater vehicle comprises a second plurality of hydrophones wherein said first plurality of hydrophones, and/or said second plurality of hydrophones, is arranged at different positions and/or at different angles, and wherein at least one of the at least one base station and the at least one underwater vehicle comprises a noise mitigation software and/or a hardware stage, configured for performing at least one signals processing technique of the following list: a frequency-based noise mitigation processing; a matrix factorization noise mitigation processing; and an adaptive and/or predictive filtering for noise mitigation.

16. An underwater system comprising:

at least one base station for an underwater vehicle, the at least one base station comprising:

at least a first hydrophone, adapted and/or configured for transmitting and receiving ultrasonic and/or acoustic signals, and at least a first optical communication device, comprising an optical transmitter and/or an optical receiver; and at least one underwater vehicle, configured to be operatively coupled with the at least one base station, the at least one underwater vehicle comprising:

at least a second hydrophone, adapted and/or configured for transmitting and receiving ultrasonic and/or acoustic signals, and at least a second optical communication device, comprising an optical transmitter and/or an optical receiver, wherein at least one of the first optical communication device and the second optical communication device is configured to transmit at least one optical signal and wherein at least one of the first optical communication device and the second optical communication device is configured to receive said at least one optical signal, wherein the at least one base station and the at least one underwater vehicle are configured to transmit at least one ultrasonic and/or acoustic signal simultaneously on a plurality of frequency-spaced transmission channels and being configured to modulate, and subsequently transmit, the at least one ultrasonic and/or acoustic signal according to an FSK modulation, or an ASK modulation, or a PSK modulation, wherein said plurality of frequency-spaced transmission channels comprises at least one data channel and at least one synchronization channel, the at least one base station and the at least one underwater vehicle being configured to keep a synchronization of transmission of ultrasonic and/or acoustic signals on said at least one data channel utilizing data contained in an ultrasonic and/or acoustic signal transmitted on the synchronization channel, wherein at least part of said at least oneultrasonic and/or acoustic signal is asynchronous, and wherein at least one of the at least one base station and the at least one underwater vehicle is configured to transmit the at least part of said at least one ultrasonic and/or acoustic signal asynchronously or according to an asynchronous protocol and is configured to transmit a synchronizing ultrasonic and/or acoustic signal on the at least one synchronization channel of the plurality of frequency-spaced transmission channels.

* * * * *